United States Patent
Fowler et al.

(10) Patent No.: US 11,376,545 B2
(45) Date of Patent: Jul. 5, 2022

(54) RAPID CYCLE ADSORBENT BED

(71) Applicant: ExxonMobil Upstream Research Company, Spring, TX (US)

(72) Inventors: Tracy A. Fowler, Magnolia, TX (US); Ananda Nagavarapu, Houston, TX (US); William Alan Whittenberger, Leavittsburg, OH (US); Haridas Attur, Ravenna, OH (US); Brian Lee Davis, Ravenna, OH (US)

(73) Assignee: ExxonMobil Upstream Research Company, Spring, TX (US)

( * ) Notice: Subject to any disclaimer, the term of this patent is extended or adjusted under 35 U.S.C. 154(b) by 297 days.

(21) Appl. No.: 16/822,518

(22) Filed: Mar. 18, 2020

(65) Prior Publication Data

US 2020/0346162 A1    Nov. 5, 2020

Related U.S. Application Data

(60) Provisional application No. 62/840,770, filed on Apr. 30, 2019.

(51) Int. Cl.
    *B01J 20/28*      (2006.01)
    *B01D 53/04*      (2006.01)
    *B01D 53/047*      (2006.01)

(52) U.S. Cl.
    CPC ..... *B01D 53/0473* (2013.01); *B01D 53/0407* (2013.01); *B01J 20/28052* (2013.01); *B01D 2259/401* (2013.01)

(58) Field of Classification Search
    CPC ................ B01D 53/04; B01D 53/0407; B01D 53/0423; B01D 53/0462; B01D 53/0473;
(Continued)

(56) References Cited

U.S. PATENT DOCUMENTS 1,868,138 A    7/1932   Fisk
2,646,391 A    7/1953   Houdry
(Continued)

FOREIGN PATENT DOCUMENTS

EP      0257493      2/1988
EP      0426937      5/1991
(Continued)

OTHER PUBLICATIONS

Cheung, O. et al., (2013) "Adsorption kinetics for CO2 on highly selective zeolites NaKA and nano-NaKA," *ApplEnerg*, 112, pp. 1326-1336.
(Continued)

*Primary Examiner* — Frank M Lawrence, Jr.
(74) *Attorney, Agent, or Firm* — ExxonMobil Upstream Research Company—Law Department

(57) ABSTRACT

The disclosure provides for an adsorbent bed assembly for separation of gaseous mixtures. The assembly includes a body defining an interior cavity. The body includes an outer shell, and first and second ends engaged with the outer shell that include inputs/outputs. A central support structure is positioned within the interior cavity and is engaged with the body or forms a portion thereof. Anti-telescoping devices are positioned about the central support structure, at least one of which is affixed to the central support structure. Each anti-telescoping device includes a plurality of spokes extending within the interior cavity from or proximate the central support structure towards the outer shell.

24 Claims, 16 Drawing Sheets

(58) Field of Classification Search
CPC ............ B01D 2259/41; B01J 20/28052; B01J 20/28045
USPC ......... 95/90, 96; 96/108, 121, 131, 152, 154
See application file for complete search history.

(56) References Cited

U.S. PATENT DOCUMENTS

| | | |
|---|---|---|
| 3,103,425 A | 9/1963 | Meyer |
| 3,124,152 A | 3/1964 | Payne |
| 3,142,547 A | 7/1964 | Marsh et al. |
| 3,432,995 A * | 3/1969 | Karl .............. B01D 53/0446 96/132 |
| 3,508,758 A | 4/1970 | Strub |
| 3,594,983 A | 7/1971 | Yearout |
| 3,602,247 A | 8/1971 | Bunn et al. |
| 3,788,036 A | 1/1974 | Lee et al. |
| 3,967,464 A | 7/1976 | Cormier et al. |
| 4,187,092 A | 2/1980 | Woolley |
| 4,261,815 A | 4/1981 | Kelland |
| 4,324,565 A | 4/1982 | Benkmann |
| 4,325,565 A | 4/1982 | Winchell |
| 4,329,162 A | 5/1982 | Pitcher |
| 4,340,398 A | 7/1982 | Doshi et al. |
| 4,386,947 A | 6/1983 | Mizuno et al. |
| 4,421,531 A | 12/1983 | Dalton, Jr. et al. |
| 4,445,441 A | 5/1984 | Tanca |
| 4,461,630 A | 7/1984 | Cassidy et al. |
| 4,496,376 A | 1/1985 | Hradek |
| 4,559,065 A | 12/1985 | Null et al. |
| 4,631,073 A | 12/1986 | Null et al. |
| 4,673,420 A * | 6/1987 | Haker .............. B01D 53/261 55/516 |
| 4,693,730 A | 9/1987 | Miller et al. |
| 4,705,627 A | 11/1987 | Miwa et al. |
| 4,711,968 A | 12/1987 | Oswald et al. |
| 4,737,170 A | 4/1988 | Searle |
| 4,770,676 A | 9/1988 | Sircar et al. |
| 4,783,205 A | 11/1988 | Searle |
| 4,784,672 A | 11/1988 | Sircar |
| 4,790,272 A | 12/1988 | Woolenweber |
| 4,814,146 A | 3/1989 | Brand et al. |
| 4,816,039 A | 3/1989 | Krishnamurthy et al. |
| 4,877,429 A | 10/1989 | Hunter |
| 4,977,745 A | 12/1990 | Heichberger |
| 5,110,328 A | 5/1992 | Yokota et al. |
| 5,125,934 A | 6/1992 | Krishnamurthy et al. |
| 5,169,006 A | 12/1992 | Stelzer |
| 5,169,414 A | 12/1992 | Panzica et al. |
| 5,174,796 A | 12/1992 | Davis et al. |
| 5,224,350 A | 7/1993 | Mehra |
| 5,234,472 A | 8/1993 | Krishnamurthy et al. |
| 5,292,990 A | 3/1994 | Kantner et al. |
| 5,306,331 A | 4/1994 | Auvil et al. |
| 5,354,346 A | 10/1994 | Kumar |
| 5,365,011 A | 11/1994 | Ramachandran et al. |
| 5,370,728 A | 12/1994 | LaSala et al. |
| 5,486,227 A | 1/1996 | Kumar et al. |
| 5,503,782 A | 4/1996 | Dyrud et al. |
| 5,547,641 A | 8/1996 | Smith et al. |
| 5,565,018 A | 10/1996 | Baksh et al. |
| 5,595,910 A * | 1/1997 | Kant .............. B01D 53/85 435/297.5 |
| 5,647,891 A | 7/1997 | Blizzard et al. |
| 5,669,962 A | 9/1997 | Dunne |
| 5,672,196 A | 9/1997 | Acharya et al. |
| 5,700,310 A | 12/1997 | Bowman et al. |
| 5,733,451 A | 3/1998 | Coellner et al. |
| 5,735,938 A | 4/1998 | Baksh et al. |
| 5,750,026 A | 5/1998 | Gadkaree et al. |
| 5,769,928 A | 6/1998 | Leavitt |
| 5,779,768 A | 7/1998 | Anand et al. |
| 5,792,239 A | 8/1998 | Reinhold, III et al. |
| 5,807,423 A | 9/1998 | Lemcoff et al. |
| 5,811,616 A | 9/1998 | Holub et al. |
| 5,827,358 A | 10/1998 | Kulish et al. |
| 5,827,577 A | 10/1998 | Spencer |
| 5,882,380 A | 3/1999 | Sircar |
| 5,906,673 A | 5/1999 | Reinhold, III et al. |
| 5,908,480 A | 6/1999 | Ban |
| 5,912,426 A | 6/1999 | Smolarek et al. |
| 5,914,294 A | 6/1999 | Park et al. |
| 5,924,307 A | 7/1999 | Nenov |
| 5,935,444 A | 8/1999 | Johnson et al. |
| 5,951,744 A | 9/1999 | Rohrbach et al. |
| 5,968,234 A | 10/1999 | Midgett, II et al. |
| 5,976,221 A | 11/1999 | Bowman et al. |
| 5,997,617 A | 12/1999 | Czabala et al. |
| 6,007,606 A | 12/1999 | Baksh et al. |
| 6,011,192 A | 1/2000 | Baker et al. |
| 6,023,942 A | 2/2000 | Thomas et al. |
| 6,053,966 A | 4/2000 | Moreau et al. |
| 6,063,161 A | 5/2000 | Keefer et al. |
| 6,096,115 A | 8/2000 | Kleinberg |
| 6,099,621 A | 8/2000 | Ho |
| 6,102,985 A | 8/2000 | Naheiri et al. |
| 6,129,780 A | 10/2000 | Millet et al. |
| 6,136,222 A | 10/2000 | Friesen et al. |
| 6,147,126 A | 11/2000 | DeGeorge et al. |
| 6,152,991 A | 11/2000 | Ackley |
| 6,156,101 A | 12/2000 | Naheiri |
| 6,171,371 B1 | 1/2001 | Derive et al. |
| 6,176,897 B1 | 1/2001 | Keefer |
| 6,179,900 B1 | 1/2001 | Behling et al. |
| 6,183,538 B1 | 2/2001 | Naheiri |
| 6,194,079 B1 | 2/2001 | Hekal |
| 6,210,466 B1 | 4/2001 | Whysall et al. |
| 6,231,302 B1 | 5/2001 | Bonardi |
| 6,245,127 B1 | 6/2001 | Kane et al. |
| 6,284,021 B1 | 9/2001 | Lu et al. |
| 6,311,719 B1 | 11/2001 | Hill et al. |
| 6,345,954 B1 | 2/2002 | Al-Himyary et al. |
| 6,398,853 B1 | 6/2002 | Keefer et al. |
| 6,402,813 B2 | 6/2002 | Monereau et al. |
| 6,406,523 B1 | 6/2002 | Connor et al. |
| 6,425,938 B1 | 7/2002 | Xu et al. |
| 6,432,379 B1 | 8/2002 | Heung |
| 6,436,171 B1 | 8/2002 | Wang et al. |
| 6,444,012 B1 | 9/2002 | Dolan et al. |
| 6,444,014 B1 | 9/2002 | Mullhaupt et al. |
| 6,444,523 B1 | 9/2002 | Fan et al. |
| 6,444,610 B1 | 9/2002 | Yamamoto |
| 6,451,095 B1 | 9/2002 | Keefer et al. |
| 6,457,485 B2 | 10/2002 | Hill et al. |
| 6,458,187 B1 | 10/2002 | Fritz et al. |
| 6,464,761 B1 | 10/2002 | Bugli |
| 6,471,749 B1 | 10/2002 | Kawai et al. |
| 6,471,939 B1 | 10/2002 | Boix et al. |
| 6,488,747 B1 | 12/2002 | Keefer |
| 6,497,750 B2 | 12/2002 | Butwell et al. |
| 6,500,234 B1 | 12/2002 | Ackley et al. |
| 6,500,241 B2 | 12/2002 | Reddy |
| 6,500,404 B1 | 12/2002 | Camblor Fernandez et al. |
| 6,503,299 B2 | 1/2003 | Baksh et al. |
| 6,506,351 B1 | 1/2003 | Jain et al. |
| 6,514,318 B2 | 2/2003 | Keefer |
| 6,514,319 B2 | 2/2003 | Keefer et al. |
| 6,517,609 B1 | 2/2003 | Monereau et al. |
| 6,531,516 B2 | 3/2003 | Davis et al. |
| 6,533,846 B1 | 3/2003 | Keefer et al. |
| 6,565,627 B1 | 5/2003 | Golden et al. |
| 6,565,635 B2 | 5/2003 | Keefer et al. |
| 6,565,825 B2 | 5/2003 | Ohji et al. |
| 6,572,678 B1 | 6/2003 | Wijmans et al. |
| 6,579,341 B2 | 6/2003 | Baker et al. |
| 6,593,541 B1 | 7/2003 | Herren |
| 6,595,233 B2 | 7/2003 | Pulli |
| 6,605,136 B1 | 8/2003 | Graham et al. |
| 6,607,584 B2 | 8/2003 | Moreau et al. |
| 6,630,012 B2 | 10/2003 | Wegeng et al. |
| 6,631,626 B1 | 10/2003 | Hahn |
| 6,641,645 B1 | 11/2003 | Lee et al. |
| 6,651,645 B1 | 11/2003 | Nunez-Suarez |
| 6,660,064 B2 | 12/2003 | Golden et al. |
| 6,660,065 B2 | 12/2003 | Byrd et al. |

(56) References Cited

U.S. PATENT DOCUMENTS

| | | | |
|---|---|---|---|
| 6,692,626 | B2 | 2/2004 | Keefer et al. |
| 6,712,087 | B2 | 3/2004 | Hill et al. |
| 6,742,507 | B2 | 6/2004 | Keefer et al. |
| 6,746,515 | B2 | 6/2004 | Wegeng et al. |
| 6,752,852 | B1 | 6/2004 | Jacksier et al. |
| 6,770,120 | B2 | 8/2004 | Neu et al. |
| 6,773,225 | B2 | 8/2004 | Yuri et al. |
| 6,802,889 | B2 | 10/2004 | Graham et al. |
| 6,814,771 | B2 | 11/2004 | Scardino et al. |
| 6,835,354 | B2 | 12/2004 | Woods et al. |
| 6,840,985 | B2 | 1/2005 | Keefer |
| 6,866,950 | B2 | 3/2005 | Connor et al. |
| 6,889,710 | B2 | 5/2005 | Wagner |
| 6,890,376 | B2 | 5/2005 | Arquin et al. |
| 6,893,483 | B2 | 5/2005 | Golden et al. |
| 6,902,602 | B2 | 6/2005 | Keefer et al. |
| 6,916,358 | B2 | 7/2005 | Nakamura et al. |
| 6,918,953 | B2 | 7/2005 | Lomax, Jr. et al. |
| 6,921,597 | B2 | 7/2005 | Keefer et al. |
| 6,936,561 | B2 | 8/2005 | Marques et al. |
| 6,974,496 | B2 | 12/2005 | Wegeng et al. |
| 7,025,801 | B2 | 4/2006 | Monereau |
| 7,027,929 | B2 | 4/2006 | Wang |
| 7,029,521 | B2 | 4/2006 | Johansson |
| 7,074,323 | B2 | 7/2006 | Ghijsen |
| 7,077,891 | B2 | 7/2006 | Jaffe et al. |
| 7,087,331 | B2 | 8/2006 | Keefer et al. |
| 7,094,275 | B2 | 8/2006 | Keefer et al. |
| 7,097,925 | B2 | 8/2006 | Keefer et al. |
| 7,112,239 | B2 | 9/2006 | Kimbara et al. |
| 7,117,669 | B2 | 10/2006 | Kaboord et al. |
| 7,122,073 | B1 | 10/2006 | Notaro et al. |
| 7,128,775 | B2 | 10/2006 | Celik et al. |
| 7,144,016 | B2 | 12/2006 | Gozdawa |
| 7,160,356 | B2 | 1/2007 | Koros et al. |
| 7,160,367 | B2 | 1/2007 | Babicki et al. |
| 7,166,149 | B2 | 1/2007 | Dunne et al. |
| 7,172,645 | B1 | 2/2007 | Pfister et al. |
| 7,189,280 | B2 | 3/2007 | Alizadeh-Khiavi et al. |
| 7,243,679 | B2 | 7/2007 | Thelen |
| 7,247,185 | B2 * | 7/2007 | Jobson ............ F01N 13/0097 55/482 |
| 7,250,073 | B2 | 7/2007 | Keefer et al. |
| 7,250,074 | B2 | 7/2007 | Tonkovich et al. |
| 7,255,727 | B2 | 8/2007 | Monereau et al. |
| 7,258,725 | B2 | 8/2007 | Ohmi et al. |
| 7,276,107 | B2 | 10/2007 | Baksh et al. |
| 7,279,029 | B2 | 10/2007 | Occhialini et al. |
| 7,285,350 | B2 | 10/2007 | Keefer et al. |
| 7,297,279 | B2 | 11/2007 | Johnson et al. |
| 7,311,763 | B2 | 12/2007 | Neary |
| RE40,006 | E | 1/2008 | Keefer et al. |
| 7,314,503 | B2 | 1/2008 | Landrum et al. |
| 7,354,562 | B2 | 4/2008 | Ying et al. |
| 7,387,849 | B2 | 6/2008 | Keefer et al. |
| 7,390,350 | B2 | 6/2008 | Weist, Jr. et al. |
| 7,404,846 | B2 | 7/2008 | Golden et al. |
| 7,438,079 | B2 | 10/2008 | Cohen et al. |
| 7,449,049 | B2 | 11/2008 | Thomas et al. |
| 7,456,131 | B2 | 11/2008 | Klett et al. |
| 7,510,601 | B2 | 3/2009 | Whitley et al. |
| 7,527,670 | B2 | 5/2009 | Ackley et al. |
| 7,553,568 | B2 | 6/2009 | Keefer |
| 7,560,154 | B2 | 7/2009 | Katoh |
| 7,578,864 | B2 | 8/2009 | Watanabe et al. |
| 7,604,682 | B2 | 10/2009 | Seaton |
| 7,637,989 | B2 | 12/2009 | Bong |
| 7,641,716 | B2 | 1/2010 | Lomax, Jr. et al. |
| 7,645,324 | B2 | 1/2010 | Rode et al. |
| 7,651,549 | B2 | 1/2010 | Whitley |
| 7,674,319 | B2 | 3/2010 | Lomax, Jr. et al. |
| 7,674,539 | B2 | 3/2010 | Keefer et al. |
| 7,687,044 | B2 | 3/2010 | Keefer et al. |
| 7,713,333 | B2 | 5/2010 | Rege et al. |
| 7,717,981 | B2 | 5/2010 | LaBuda et al. |
| 7,722,700 | B2 | 5/2010 | Sprinkle |
| 7,731,782 | B2 | 6/2010 | Kelley et al. |
| 7,740,687 | B2 | 6/2010 | Reinhold, III |
| 7,744,676 | B2 | 6/2010 | Leitmayr et al. |
| 7,744,677 | B2 | 6/2010 | Barclay et al. |
| 7,758,051 | B2 | 7/2010 | Roberts-Haritonov et al. |
| 7,758,988 | B2 | 7/2010 | Keefer et al. |
| 7,763,098 | B2 | 7/2010 | Alizadeh-Khiavi et al. |
| 7,763,099 | B2 | 7/2010 | Verma et al. |
| 7,792,983 | B2 | 9/2010 | Mishra et al. |
| 7,793,675 | B2 | 9/2010 | Cohen et al. |
| 7,806,965 | B2 | 10/2010 | Stinson |
| 7,819,948 | B2 | 10/2010 | Wagner |
| 7,828,877 | B2 | 11/2010 | Sawada et al. |
| 7,828,880 | B2 | 11/2010 | Moriya et al. |
| 7,854,793 | B2 | 12/2010 | Rarig et al. |
| 7,858,169 | B2 | 12/2010 | Yamashita |
| 7,862,645 | B2 | 1/2011 | Whitley et al. |
| 7,867,320 | B2 | 1/2011 | Baksh et al. |
| 7,902,114 | B2 | 3/2011 | Bowie et al. |
| 7,938,886 | B2 | 5/2011 | Hershkowitz et al. |
| 7,947,118 | B2 | 5/2011 | Rarig et al. |
| 7,947,120 | B2 | 5/2011 | Deckman et al. |
| 7,959,720 | B2 | 6/2011 | Deckman et al. |
| 8,016,918 | B2 | 9/2011 | LaBuda et al. |
| 8,034,164 | B2 | 10/2011 | Lomax, Jr. et al. |
| 8,071,063 | B2 | 12/2011 | Reyes et al. |
| 8,128,734 | B2 | 3/2012 | Song |
| 8,142,745 | B2 | 3/2012 | Reyes et al. |
| 8,142,746 | B2 | 3/2012 | Reyes et al. |
| 8,192,709 | B2 | 6/2012 | Reyes et al. |
| 8,210,772 | B2 | 7/2012 | Gillecriosd |
| 8,227,121 | B2 | 7/2012 | Adams et al. |
| 8,262,773 | B2 | 9/2012 | Northrop et al. |
| 8,262,783 | B2 | 9/2012 | Stoner et al. |
| 8,268,043 | B2 | 9/2012 | Celik et al. |
| 8,268,044 | B2 | 9/2012 | Wright et al. |
| 8,272,401 | B2 | 9/2012 | McLean |
| 8,287,629 | B2 | 10/2012 | Fujita et al. |
| 8,319,090 | B2 | 11/2012 | Kitamura |
| 8,337,594 | B2 | 12/2012 | Corma Canos et al. |
| 8,361,200 | B2 | 1/2013 | Sayari et al. |
| 8,361,205 | B2 | 1/2013 | Desai et al. |
| 8,377,173 | B2 | 2/2013 | Chuang |
| 8,444,750 | B2 | 5/2013 | Deckman et al. |
| 8,449,649 | B2 | 5/2013 | Greenough |
| 8,470,395 | B2 | 6/2013 | Khiavi et al. |
| 8,480,795 | B2 | 7/2013 | Siskin et al. |
| 8,512,569 | B2 | 8/2013 | Eaton et al. |
| 8,518,356 | B2 | 8/2013 | Schaffer et al. |
| 8,529,662 | B2 | 9/2013 | Kelley et al. |
| 8,529,663 | B2 | 9/2013 | Reyes et al. |
| 8,529,664 | B2 | 9/2013 | Deckman et al. |
| 8,529,665 | B2 | 9/2013 | Manning et al. |
| 8,535,414 | B2 | 9/2013 | Johnson et al. |
| 8,545,602 | B2 | 10/2013 | Chance et al. |
| 8,551,444 | B2 | 10/2013 | Agnihotri et al. |
| 8,573,124 | B2 | 11/2013 | Havran et al. |
| 8,591,627 | B2 | 11/2013 | Jain |
| 8,591,634 | B2 | 11/2013 | Winchester et al. |
| 8,616,233 | B2 | 12/2013 | McLean et al. |
| 8,657,922 | B2 | 2/2014 | Yamawaki et al. |
| 8,673,059 | B2 | 3/2014 | Leta et al. |
| 8,680,344 | B2 | 3/2014 | Weston et al. |
| 8,715,617 | B2 | 5/2014 | Genkin et al. |
| 8,741,243 | B2 | 6/2014 | Gadkaree et al. |
| 8,752,390 | B2 | 6/2014 | Wright et al. |
| 8,753,428 | B2 | 6/2014 | Lomax, Jr. et al. |
| 8,778,051 | B2 | 7/2014 | Weist, Jr. et al. |
| 8,784,533 | B2 | 7/2014 | Leta et al. |
| 8,784,534 | B2 | 7/2014 | Kamakoti et al. |
| 8,784,535 | B2 | 7/2014 | Ravikovitch et al. |
| 8,790,618 | B2 | 7/2014 | Adams et al. |
| 8,795,411 | B2 | 8/2014 | Hufton et al. |
| 8,808,425 | B2 | 8/2014 | Genkin et al. |
| 8,808,426 | B2 | 8/2014 | Sundaram |
| 8,814,985 | B2 | 8/2014 | Gerds et al. |
| 8,852,322 | B2 | 10/2014 | Gupta et al. |
| 8,858,683 | B2 | 10/2014 | Deckman |

(56) References Cited

U.S. PATENT DOCUMENTS

| | | |
|---|---|---|
| 8,875,483 B2 | 11/2014 | Wettstein |
| 8,906,138 B2 | 12/2014 | Rasmussen et al. |
| 8,921,637 B2 | 12/2014 | Sundaram et al. |
| 8,932,386 B2 | 1/2015 | Bouvier et al. |
| 8,939,014 B2 | 1/2015 | Kamakoti et al. |
| 9,005,561 B2 | 4/2015 | Leta |
| 9,017,457 B2 | 4/2015 | Tammera |
| 9,028,595 B2 | 5/2015 | Sundaram et al. |
| 9,034,078 B2 | 5/2015 | Wanni et al. |
| 9,034,079 B2 | 5/2015 | Deckman et al. |
| 9,050,553 B2 | 6/2015 | Alizadeh-Khiavi et al. |
| 9,067,168 B2 | 6/2015 | Frederick et al. |
| 9,067,169 B2 | 6/2015 | Patel |
| 9,095,809 B2 | 8/2015 | Deckman et al. |
| 9,108,145 B2 | 8/2015 | Kalbassi et al. |
| 9,120,049 B2 | 9/2015 | Sundaram et al. |
| 9,126,138 B2 | 9/2015 | Deckman et al. |
| 9,162,175 B2 | 10/2015 | Sundaram |
| 9,168,483 B2 | 10/2015 | Ravikovitch et al. |
| 9,168,485 B2 | 10/2015 | Deckman et al. |
| 9,272,264 B2 | 3/2016 | Coupland |
| 9,278,338 B2 | 3/2016 | Coupland |
| 9,358,493 B2 | 6/2016 | Tammera et al. |
| 9,358,496 B2 * | 6/2016 | Berges .............. B01D 53/0407 |
| 9,573,116 B2 | 2/2017 | Johnson et al. |
| 9,597,655 B2 | 3/2017 | Beeckman |
| 9,713,787 B2 | 7/2017 | Owens et al. |
| 9,737,846 B2 | 8/2017 | Carstensen et al. |
| 9,744,521 B2 | 8/2017 | Brody et al. |
| 10,040,022 B2 | 8/2018 | Fowler et al. |
| 10,080,991 B2 | 9/2018 | Johnson et al. |
| 10,080,992 B2 | 9/2018 | Nagavarapu et al. |
| 10,124,286 B2 | 11/2018 | McMahon et al. |
| 10,882,002 B2 | 1/2021 | Vittenet |
| 2001/0047824 A1 | 12/2001 | Hill et al. |
| 2002/0053547 A1 | 5/2002 | Schlegel et al. |
| 2002/0124885 A1 | 9/2002 | Hill et al. |
| 2002/0162452 A1 | 11/2002 | Butwell et al. |
| 2003/0075485 A1 | 4/2003 | Ghijsen |
| 2003/0129101 A1 | 7/2003 | Zettel |
| 2003/0131728 A1 | 7/2003 | Kanazirev et al. |
| 2003/0145726 A1 | 8/2003 | Gueret et al. |
| 2003/0170527 A1 | 9/2003 | Finn et al. |
| 2003/0188635 A1 | 10/2003 | Lomax, Jr. et al. |
| 2003/0202918 A1 | 10/2003 | Ashida et al. |
| 2003/0205130 A1 | 11/2003 | Neu et al. |
| 2003/0223856 A1 | 12/2003 | Yuri et al. |
| 2004/0099142 A1 | 5/2004 | Arquin et al. |
| 2004/0118277 A1 | 6/2004 | Kim |
| 2004/0118747 A1 | 6/2004 | Cutler et al. |
| 2004/0197596 A1 | 10/2004 | Connor et al. |
| 2004/0232622 A1 | 11/2004 | Gozdawa |
| 2005/0045041 A1 | 3/2005 | Hechinger et al. |
| 2005/0109419 A1 | 5/2005 | Ohmi et al. |
| 2005/0114032 A1 | 5/2005 | Wang |
| 2005/0129952 A1 | 6/2005 | Sawada et al. |
| 2005/0145111 A1 | 7/2005 | Keefer et al. |
| 2005/0150378 A1 | 7/2005 | Dunne et al. |
| 2005/0229782 A1 | 10/2005 | Monereau et al. |
| 2005/0252378 A1 | 11/2005 | Celik et al. |
| 2006/0017940 A1 | 1/2006 | Takayama |
| 2006/0048648 A1 | 3/2006 | Gibbs et al. |
| 2006/0049102 A1 | 3/2006 | Miller et al. |
| 2006/0076270 A1 | 4/2006 | Poshusta et al. |
| 2006/0099096 A1 | 5/2006 | Shaffer et al. |
| 2006/0105158 A1 | 5/2006 | Fritz et al. |
| 2006/0116430 A1 | 6/2006 | Wentink et al. |
| 2006/0116460 A1 | 6/2006 | Georget et al. |
| 2006/0150811 A1 * | 7/2006 | Callahan .............. F02M 35/02 96/108 |
| 2006/0162556 A1 | 7/2006 | Ackley et al. |
| 2006/0165574 A1 | 7/2006 | Sayari |
| 2006/0169142 A1 | 8/2006 | Rode et al. |
| 2006/0236862 A1 | 10/2006 | Golden et al. |
| 2006/0236867 A1 | 10/2006 | Neary |
| 2006/0245982 A1 * | 11/2006 | Whittenberger ..... B01J 19/2495 422/148 |
| 2007/0084241 A1 | 4/2007 | Kretchmer et al. |
| 2007/0084344 A1 | 4/2007 | Moriya et al. |
| 2007/0187029 A1 | 8/2007 | Axtell et al. |
| 2007/0222160 A1 | 9/2007 | Roberts-Haritonov et al. |
| 2007/0253872 A1 | 11/2007 | Keefer et al. |
| 2007/0261550 A1 | 11/2007 | Ota |
| 2007/0261557 A1 | 11/2007 | Gadkaree et al. |
| 2007/0283807 A1 | 12/2007 | Whitley |
| 2008/0051279 A1 | 2/2008 | Klett et al. |
| 2008/0072822 A1 | 3/2008 | White |
| 2008/0128655 A1 | 6/2008 | Garg et al. |
| 2008/0202336 A1 | 8/2008 | Hofer et al. |
| 2008/0236389 A1 | 10/2008 | Leedy et al. |
| 2008/0282883 A1 | 11/2008 | Rarig et al. |
| 2008/0282884 A1 | 11/2008 | Kelley et al. |
| 2008/0282885 A1 | 11/2008 | Deckman et al. |
| 2008/0282886 A1 | 11/2008 | Reyes et al. |
| 2008/0282887 A1 | 11/2008 | Chance |
| 2008/0282892 A1 | 11/2008 | Deckman et al. |
| 2008/0289497 A1 | 11/2008 | Barclay et al. |
| 2008/0307966 A1 | 12/2008 | Stinson |
| 2008/0314550 A1 | 12/2008 | Greco |
| 2009/0004073 A1 | 1/2009 | Gleize et al. |
| 2009/0014902 A1 | 1/2009 | Koivunen et al. |
| 2009/0025553 A1 | 1/2009 | Keefer et al. |
| 2009/0025555 A1 | 1/2009 | Lively et al. |
| 2009/0037550 A1 | 2/2009 | Mishra et al. |
| 2009/0071333 A1 | 3/2009 | LaBuda et al. |
| 2009/0079870 A1 | 3/2009 | Matsui |
| 2009/0107332 A1 | 4/2009 | Wagner |
| 2009/0151559 A1 | 6/2009 | Verma et al. |
| 2009/0162268 A1 | 6/2009 | Hufton et al. |
| 2009/0180423 A1 | 7/2009 | Kroener |
| 2009/0241771 A1 | 10/2009 | Manning et al. |
| 2009/0284013 A1 | 11/2009 | Anand et al. |
| 2009/0294366 A1 | 12/2009 | Wright et al. |
| 2009/0308248 A1 | 12/2009 | Siskin et al. |
| 2009/0314159 A1 | 12/2009 | Haggerty |
| 2010/0059701 A1 | 3/2010 | McLean |
| 2010/0077920 A1 | 4/2010 | Baksh et al. |
| 2010/0089241 A1 | 4/2010 | Stoner et al. |
| 2010/0132548 A1 | 6/2010 | Dunne et al. |
| 2010/0186445 A1 | 7/2010 | Minta et al. |
| 2010/0212493 A1 | 8/2010 | Rasmussen et al. |
| 2010/0251887 A1 | 10/2010 | Jain |
| 2010/0252497 A1 | 10/2010 | Ellison et al. |
| 2010/0263534 A1 | 10/2010 | Chuang |
| 2010/0282593 A1 | 11/2010 | Speirs et al. |
| 2010/0288704 A1 | 11/2010 | Amsden et al. |
| 2011/0011803 A1 | 1/2011 | Koros |
| 2011/0020202 A1 | 1/2011 | Gadkaree et al. |
| 2011/0031103 A1 | 2/2011 | Deckman et al. |
| 2011/0067440 A1 | 3/2011 | Van Aken |
| 2011/0067770 A1 | 3/2011 | Pederson et al. |
| 2011/0123878 A1 | 5/2011 | Jangbarwala |
| 2011/0146494 A1 | 6/2011 | Desai et al. |
| 2011/0149640 A1 | 6/2011 | Furuta et al. |
| 2011/0217218 A1 | 9/2011 | Gupta et al. |
| 2011/0277620 A1 | 11/2011 | Havran et al. |
| 2011/0291051 A1 | 12/2011 | Hershkowitz et al. |
| 2011/0296871 A1 | 12/2011 | Van Soest-Vercammen et al. |
| 2011/0308524 A1 | 12/2011 | Brey et al. |
| 2012/0024150 A1 | 2/2012 | Moniot |
| 2012/0024152 A1 | 2/2012 | Yamawaki et al. |
| 2012/0031144 A1 | 2/2012 | Northrop et al. |
| 2012/0067216 A1 | 3/2012 | Corma-Canos et al. |
| 2012/0118755 A1 | 5/2012 | Dadvand et al. |
| 2012/0118758 A1 | 5/2012 | Ellis et al. |
| 2012/0152115 A1 | 6/2012 | Gerds et al. |
| 2012/0222551 A1 | 9/2012 | Deckman |
| 2012/0222552 A1 | 9/2012 | Ravikovitch et al. |
| 2012/0222553 A1 | 9/2012 | Kamakoti et al. |
| 2012/0222554 A1 | 9/2012 | Leta et al. |
| 2012/0222555 A1 | 9/2012 | Gupta et al. |
| 2012/0227583 A1 | 9/2012 | Monereau et al. |
| 2012/0255377 A1 | 10/2012 | Kamakoti et al. |
| 2012/0272823 A1 | 11/2012 | Halder et al. |

(56) References Cited

U.S. PATENT DOCUMENTS

| | | |
|---|---|---|
| 2012/0308456 A1 | 12/2012 | Leta et al. |
| 2012/0312163 A1 | 12/2012 | Leta et al. |
| 2013/0061755 A1 | 3/2013 | Frederick et al. |
| 2013/0095996 A1 | 4/2013 | Buelow et al. |
| 2013/0225898 A1 | 8/2013 | Sundaram et al. |
| 2013/0327216 A1 | 12/2013 | Deckman et al. |
| 2014/0013955 A1 | 1/2014 | Tammera et al. |
| 2014/0060326 A1 | 3/2014 | Sundaram et al. |
| 2014/0157984 A1 | 6/2014 | Deckman et al. |
| 2014/0157986 A1 | 6/2014 | Ravikovitch et al. |
| 2014/0174291 A1 | 6/2014 | Gupta et al. |
| 2014/0208797 A1 | 7/2014 | Kelley et al. |
| 2014/0216254 A1 | 8/2014 | Tammera et al. |
| 2015/0013377 A1 | 1/2015 | Oelfke |
| 2015/0068397 A1 | 3/2015 | Boulet et al. |
| 2015/0010483 A1 | 4/2015 | Perry et al. |
| 2015/0101483 A1 | 4/2015 | Perry et al. |
| 2015/0196870 A1 | 7/2015 | Albright et al. |
| 2015/0328578 A1 | 11/2015 | Deckman et al. |
| 2015/0361102 A1 | 12/2015 | Inubshi et al. |
| 2016/0016865 A1 | 1/2016 | Dolan |
| 2016/0023155 A1 | 1/2016 | Ramkumar et al. |
| 2016/0129433 A1 | 5/2016 | Tammera et al. |
| 2016/0166972 A1 | 6/2016 | Owens et al. |
| 2016/0236135 A1 | 8/2016 | Tammera et al. |
| 2016/0332105 A1 | 11/2016 | Tammera et al. |
| 2016/0332106 A1 | 11/2016 | Tammera et al. |
| 2017/0028342 A1* | 2/2017 | Zastera ............... F02M 25/0854 |
| 2017/0056814 A1 | 3/2017 | Marshall et al. |
| 2017/0113173 A1 | 4/2017 | Fowler et al. |
| 2017/0113175 A1 | 4/2017 | Fowler et al. |
| 2017/0136405 A1 | 5/2017 | Ravikovitch et al. |
| 2017/0266604 A1 | 9/2017 | Tammera et al. |
| 2017/0282114 A1 | 10/2017 | Owens et al. |
| 2017/0341011 A1 | 11/2017 | Nagavarapu et al. |
| 2017/0341012 A1 | 11/2017 | Nagavarapu et al. |
| 2018/0001301 A1 | 1/2018 | Brody et al. |
| 2018/0056229 A1 | 3/2018 | Denton et al. |
| 2018/0056235 A1 | 3/2018 | Wang et al. |
| 2018/0169565 A1 | 6/2018 | Brody et al. |
| 2018/0169617 A1 | 6/2018 | Brody et al. |
| 2018/0339263 A1 | 11/2018 | Dehaas et al. |
| 2019/0224613 A1 | 7/2019 | Nagavarapu et al. |
| 2019/0262764 A1 | 8/2019 | Johnson |
| 2019/0262765 A1 | 8/2019 | Barnes et al. |
| 2020/0197856 A1 | 6/2020 | Fulton et al. |

FOREIGN PATENT DOCUMENTS

| | | |
|---|---|---|
| EP | 0904827 | 3/1999 |
| EP | 0953374 | 3/1999 |
| EP | 1110593 | 6/2001 |
| EP | 1674555 | 6/2006 |
| EP | 2754488 | 7/2014 |
| EP | 2823872 | 1/2015 |
| FR | 2854819 | 5/2003 |
| FR | 2924951 | 6/2009 |
| JP | 58-114715 | 7/1983 |
| JP | 59-232174 | 12/1984 |
| JP | 60-189318 | 12/1985 |
| JP | 2002-253818 | 10/1990 |
| JP | 04-180978 | 6/1992 |
| JP | 06006736 | 6/1992 |
| JP | H05-037318 U | 5/1993 |
| JP | H6-6736 U | 1/1994 |
| JP | 3477280 | 8/1995 |
| JP | 2011-169640 | 6/1999 |
| JP | 2011-280921 | 10/1999 |
| JP | 2000-024445 | 8/2001 |
| JP | 2002-348651 | 12/2002 |
| JP | 2006-016470 | 1/2006 |
| JP | 2006-036849 | 2/2006 |
| JP | 2008-272534 | 11/2008 |
| JP | 2011-083726 | 4/2011 |
| JP | 2013-244469 A | 12/2013 |
| JP | 2016-121414 | 7/2016 |
| KR | 101349424 | 1/2014 |
| RU | 2329094 | 12/2006 |
| RU | 2547115 C2 | 4/2015 |
| WO | WO2002/024309 | 3/2002 |
| WO | WO2002/073728 | 9/2002 |
| WO | WO 03/04438 A2 | 1/2003 |
| WO | WO2005/090793 | 9/2005 |
| WO | WO2010/024643 | 3/2010 |
| WO | WO2011/139894 | 11/2011 |

OTHER PUBLICATIONS

Cygan, R. T. et al., (2004) "Molecular Models of Hydroxide, Oxyhydroxide, and Clay Phases and the Development of a General Force Field", *J Phys Chem B*, vol. 108, pp. 1255-1266.

Deem, M. W. et al., (2009) "Computational Discovery of New Zeolite-Like Materials", *J Phys Chem C*, 113, pp. 21353-21360.

Demiralp, E., et al., (1999) "Morse Stretch Potential Charge Equilibrium Force Field for Ceramics: Application to the Quartz-Stishovite Phase Transition and to Silica Glass", *Physical Review Letters*, vol. 82(8), pp. 1708-1711.

Dubbeldam, D., et al., (2013) "On the inner workings of Monte Carlo codes" *Molecular Simulation*, vol. 39, Nos. 14-15, pp. 1253-1292.

Dubbeldam, D. et al. (2016) "RASPA: molecular simulation software for adsorption and diffusion in flexible nanoporous materials" *Molecular Simulation*, (published online Feb. 26, 2015), vol. 42(2), pp. 81-101.

Earl, D. J. et al., (2005) "Parallel tempering: Theory, applications, and new perspectives," *Phys Chem Chem Phys*, vol. 7, pp. 3910-3916.

ExxonMobil Research and Engineering and QuestAir (2008) "A New Commercialized Process for Lower Cost H2 Recovery—Rapid Cycle Pressure Swing Adsorption (RCPSA)," *Brochure*, 4 pgs.

Fang, H., et al., (2012) "Prediction of CO2 Adsorption Properties in Zeolites Using Force Fields Derived from Periodic Dispersion-Corrected DFT Calculations," J Phys Chem C, 116, ACS Publications, pp. 10692-10701.

Fang, H. et al., (2013) "First principles derived, transferable force fields for CO2 adsorption in Na-exchanged cationic zeolites," Phys Chem Chem Phys, vol. 15, pp. 12882-12894.

Fang, H. et al. (2014) "Recent Developments in First-Principles Force Fields for Molecules in Nanoporous Materials", Journal of Materials Chemistry A, 2014, vol. 2, pp. 274-291.

Fang, H. et al. (2016) "Identification of High-$CO_2$-Capacity Cationic Zeolites by Accurate Computational Screening", American Chemical Society, Chemistry of Materials, 2016, vol. 28, pp. 3887-3896.

Farooq, S. et al. (1990) "Continuous Countercurrent Flow Model for a Bulk PSA Separation Process,"*AIChE J.*, v36 (2) p. 310-314.

FlowServe (2005) "Exceeding Expectations, US Navy Cuts Maintenance Costs With Flowserve GX-200 Non-Contacting Seal Retrofits," *Face-to-Face*, v17.1, 8 pgs.

Foster, M.D., et al. "A geometric solution to the largest-free-sphere problem in zeolite frameworks", *Microporous and Mesoporous Materials*, vol. 90, pp. 32-38.

Frenkel, D. et al., (2002) "Understanding Molecular Simulation: From Algorithms to Applications", 2nd ed., *Academic Press*, pp. 292-301.

Garcia, E. J., et al. (2014) "Tuning the Adsorption Properties of Zeolites as Adsorbents for CO2 Separation: Best Compromise between the Working Capacity and Selectivity", *Ind. Eng. Chem. Res.*, vol. 53, pp. 9860-9874.

Garcia-Sanchez, A., et al. (2009) "Transferable Force Field for Carbon Dioxide Adsorption in Zeolites", J. Phys. Chem. C 2009, vol. 113, pp. 8814-8820.

GE Oil & Gas (2007) "Dry Gas Seal Retrofit," Florence, Italy, www.ge.com/oilandgas. 3 pgs.

Harris, J. G. et al., (1995) "Carbon Dioxide's Liquid—Vapor Coexistence Curve and Critical Properties as Predicted by a Simple Molecular Model", *J Phys Chem*, vol. 99, pp. 12021-12024.

(56) References Cited

OTHER PUBLICATIONS

Hill, J. R. et al., (1995) "Molecular Mechanics Potential for Silica and Zeolite Catalysts Based on ab Initio Calculations. 2. Aluminosilicates", *J Phys Chem*, vol. 99, pp. 9536-9550.

Hopper, B. et al. (2008) "World's First 10,000 psi Sour Gas Injection Compressor," *Proceedings of the 37th Turbomachinery Symposium*, pp. 73-95.

Jain, S., et al. (2003) "Heuristic design of pressure swing adsorption: a preliminary study", *Separation and Purification Technology*, vol. 33, pp. 25-43.

Jaramillo, E. et al. (2004) "Adsorption of Small Molecules in LTA Zeolites, 1. $NH_3$, $CO_2$, and $H_2O$ in Zeolite 4A", J. Phys. Chem. B 2004, vol. 108, pp. 20155-20159.

Kim J. et al. (2012) "Predicting Large CO2 Adsorption in Aluminosilicate Zeolites for Postcombustion Carbon Dioxide Capture", *J. Am. Chem, Soc.*, vol. 134, pp. 18940-18940.

Kärger, J., et al. (2012) "Diffusion in Nanoporous Materials", Whiley-VCH publisher, vol. 1, Chapter 16, pp. 483-501.

Kikkinides, E. S. et al. (1995) "Natural Gas Desulfurization by Adsorption: Feasibility and Multiplicity of Cyclic Steady States," *Ind. Eng. Chem. Res*. V. 34, pp. 255-262.

Lin, L., et al. (2012) "In silica screening of carbon-capture materials", *Nature Materials*, vol. 1, pp. 633-641.

Liu, Q. et al., (2010) "NaKA sorbents with high $CO_2$-over-$N_2$ selectivity and high capacity to adsorb $CO_2$," *Chem Commun*., vol. 46, pp. 4502-4504.

Loewenstein, W., (1954) "The Distribution of Aluminum in the Tetra-Hedra of Silicates and Aluminates" Am Mineral, 92-96.

Maurin et al. (2005) "Adsorption Mechanism of Carbon Dioxide in Faujasites: Grand Canonical Monte Carlo Simulations and Microcalorimetry Measurements", J. Phys. Chem. B 2005, vol. 109, pp. 16084-16091.

Neimark, A. V. et al., (1997) "Calibration of Pore Volume in Adsorption Experiments and Theoretical Models", *Langmuir*, vol. 13, pp. 5148-5160.

Palomino, M., et al. (2009) "New Insights on CO2-Methane Separation Using LTA Zeolites with Different Si/Al Ratios and a First Comparison with MOFs", Langmar, vol. 26(3), pp. 1910-1917.

Patcas, F.C. et al. (2007) "CO Oxidation Over Structured Carriers: A Comparison of Ceramic Forms, Honeycombs and Beads", *Chem Engineering Science*, v. 62, pp. 3984-3990.

Peng, D. Y., et al., (1976) "A New Two-Constant Equation of State", *Ind Eng Chem Fundam*, vol. 15, pp. 59-64.

Pham, T. D. et al., (2013) "Carbon Dioxide and Nitrogen Adsorption on Cation-Exchanged SSZ-13 Zeolites", Langmuir, vol. 29, pp. 832-839.

Pophale, R., et al., (2011) "A database of new zeolite-like materials", *Phys Chem Chem Phys*, vol. 13(27), pp. 1412.

Potoff, J. J. et al., (2001) "Vapor-Liquid Equilibria of Mixtures Containing Alkanes, Carbon Dioxide, and Nitrogen", AIChE J, vol. 47(7), pp. 1676-1682.

Rameshni, Mahin "Strategies for Sour Gas Field Developments," *Worley Parsons-Brochure*, 20 pp.

Reyes, S. C. et al. (1997) "Frequency Modulation 2407-12Methods for Diffusion and Adsorption Measurements in Porous Solids," *J. Phys. Chem. B*. v.101, pp. 614-622.

Rezaei, F. et al. (2009) "Optimum Structured Adsorbents for Gas Separation Process", *Chem. Engineering Science*, v. 64, pp. 5182-5191.

Richardson, J.T. et al. (2000) "Properties of Ceramic Foam Catalyst Supports: Pressure Dop", *Applied Catalysis A: General* v. 204, pp. 19-32.

Robinson, D. B., et al., (1985) "The development of the Peng-Robinson Equation and its Application to Phase Equilibrium in a System Containing Methanol," *Fluid Phase Equilibria*, vol. 24, pp. 25-41.

Ruthven, D. M. et al. (1996) "Performance of a Parallel Passage Adsorbent Contactor," *Gas. Sep. Purif*., vol. 10, No. 1, pp. 63-73.

Stahley, J. S. (2003) "Design, Operation, and Maintenance Considerations for Improved Dry Gas Seal Reliability in Centrifugal Compressors," *Dresser-Rand, Tech. Paper 134*, 15 pages.

Santos, M. S (2011) "New Cycle configuration to enhance performance of kinetic PSA processes" Chemical Engineering Science 66, pp. 1590-1599.

Snurr, R. Q. et al., (1993) "Prediction of Adsorption of Aromatic Hydrocarbons in Silicalite from Grand Canonical Monte Carlo Simulations with Biased Insertions", *J Phys Chem*, vol. 97, pp. 13742-13752.

Stemmet, C.P. et al. (2006) "Solid Foam Packings for Multiphase Reactors: Modelling of Liquid Holdup and Mass Transfer", *Chem. Engineering Research and Design*, v. 84(A12), pp. 1134-1141.

Suzuki, M. (1985) "Continuous-Countercurrent-Flow Approximation for Dynamic Steady State Profile of Pressure Swing Adsorption" *AIChE Symp. Ser*. v81 (242) pp. 67-73.

Talu, O. et al., (2001), "Reference potentials for adsorption of helium, argon, methane, and krypton in high-silica zeolites," *Colloids and Surfaces A: Physicochemical and Engineering Aspects*, vol. 83-93, pp. 83-93.

Walton, K. S. et al., (2006) "CO2 adsorption in Y and X zeolites modified by alkali metal cation exchange," *Microporous and Mesoporous Mat*, vol. 91, pp. 78-84.

Willems, T. F. et al., (2012) "Algorithms and tools for high-throughput geometry-based analysis of crystalline porous materials" *Microporous Mesoporous Mat*, vol. 149, pp. 134-141.

Zukal, A., et al., (2009) "Isosteric heats of adsorption of carbon dioxide on zeolite MCM-22 modified by alkali metal cations", *Adsorption*, vol. 15, pp. 264-270.

Agrafiotis, C. et al., "The effect of particle size on the adhesion properties of oxide washcoats on cordierite honeycombs," Journal of Materials Science Letters, 1999, vol. 18, pp. 1421-1424.

Allen, M. P. et al., (1987) "Computer Simulation of Liquids" Clarendon Press, pp. 156-160.

Asgari, M. et al., (2014) "Designing A Commercial Scale Pressure Swing Adsorber For Hydrogen Purification" *Petroleum & Coal*, vol. 56(5), pp. 552-561.

Baerlocher, C. et al., (2017) International Zeolite Association's "Database of Zeolite Structures," available at http://www.iza-stucture.org/databases/, downloaded Jun. 15, 2018, 1 page.

Bernad, S. I. (2012) "Numberical Model for Cavitational Flow in Hydraulic Poppet Valves" *Modelling and Simulation in Engineering*, vol. 2012, Article ID 742162, 10 pages.

Burtch, N.C. et al., (2015) "Molecular-level Insight into Unusual Low Pressure CO2 Affinity in Pillared Metal-Organic Frameworks," *J Am Chem Soc*, 135, pp. 7172-7180.

Beauvais, C. et al., (2004) "Distribution of Sodium Cations in Faujasite-Type Zeolite: A Canonical Parallel Tempering Simulation Study," *J Phys Chem B*, 108, pp. 399-404.

\* cited by examiner

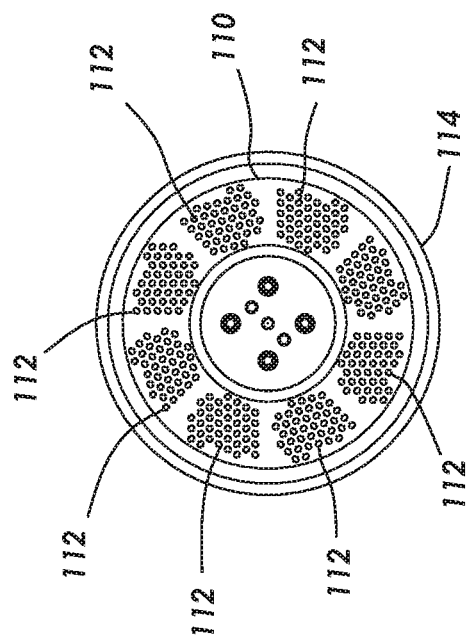 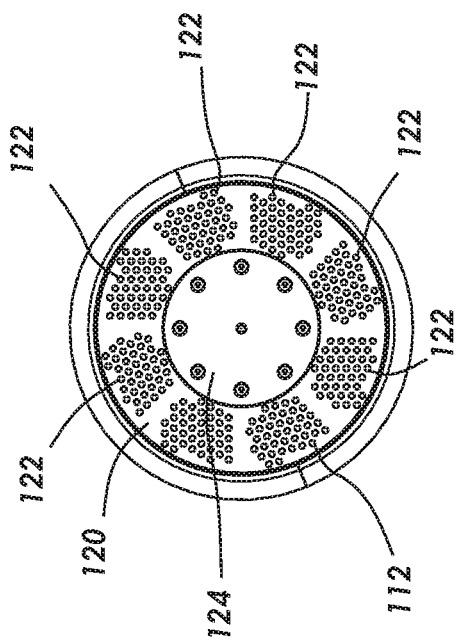 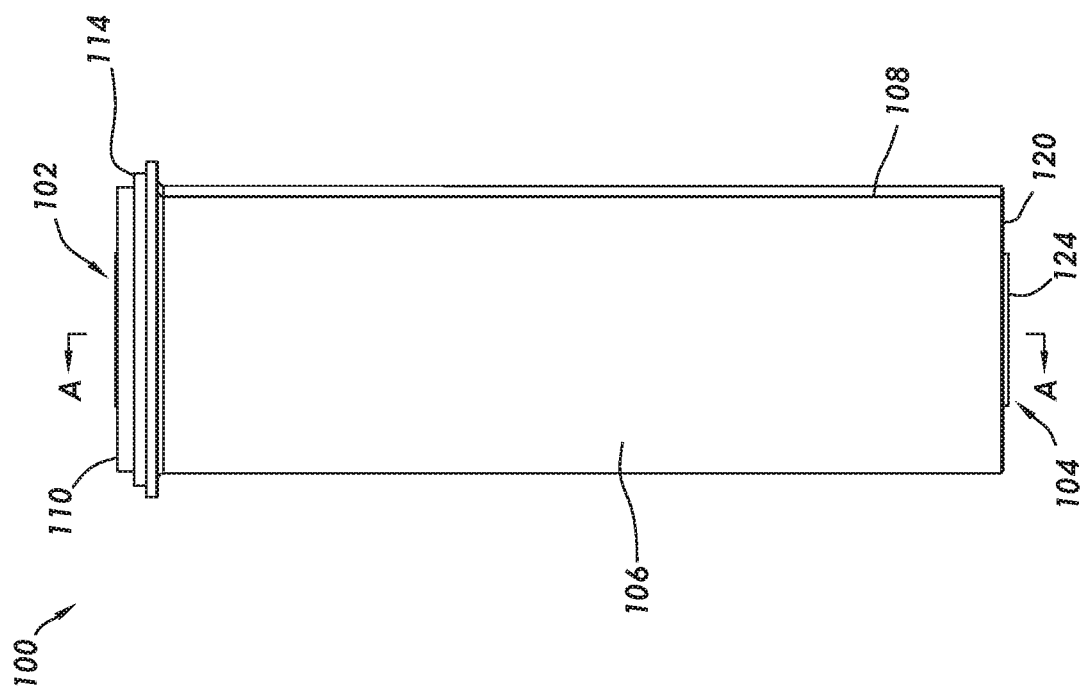

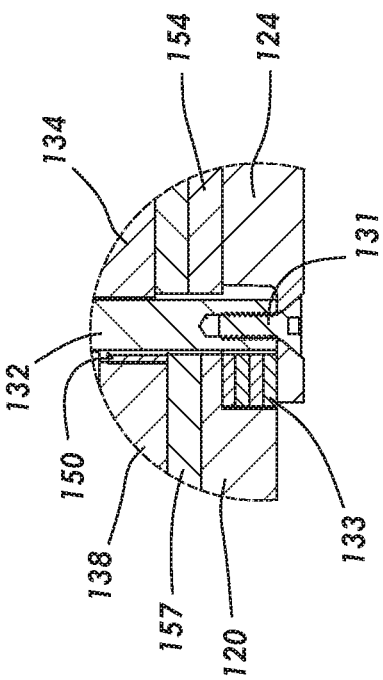
FIG.6
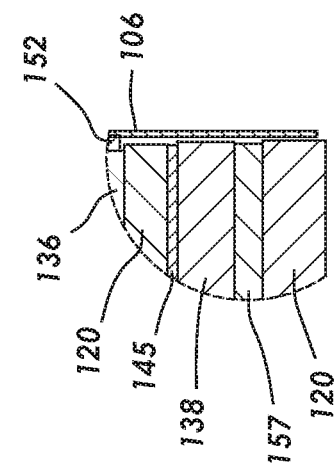
FIG.5
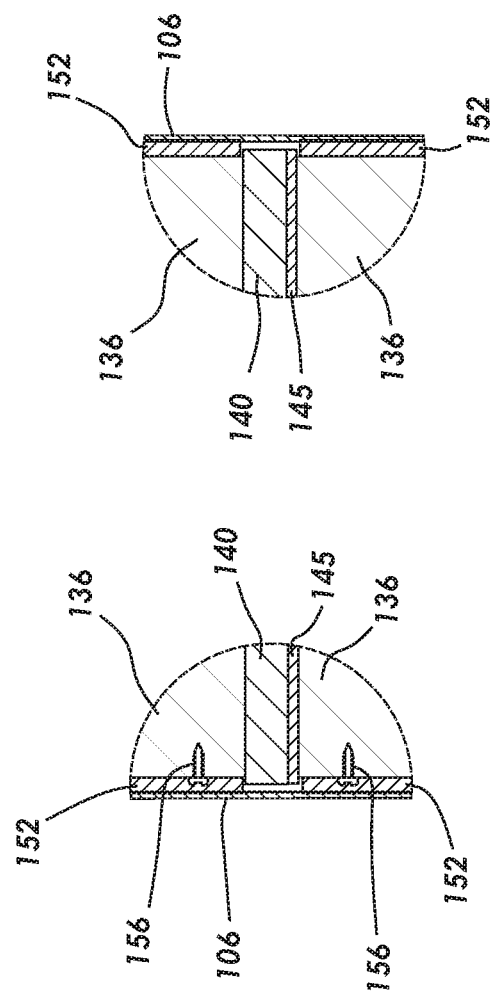
FIG.7
FIG.8
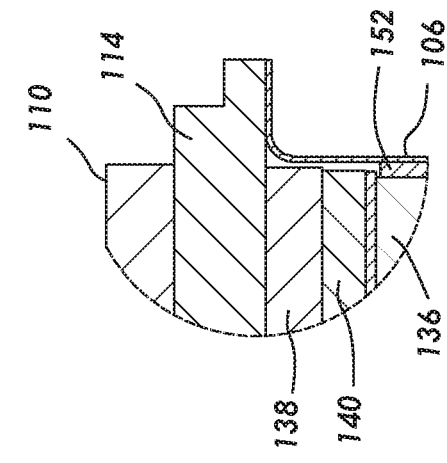
FIG.9

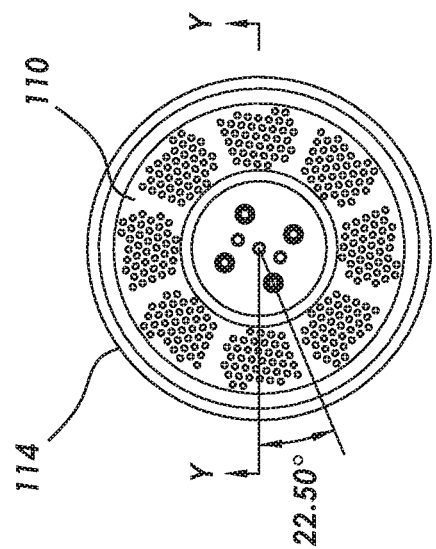
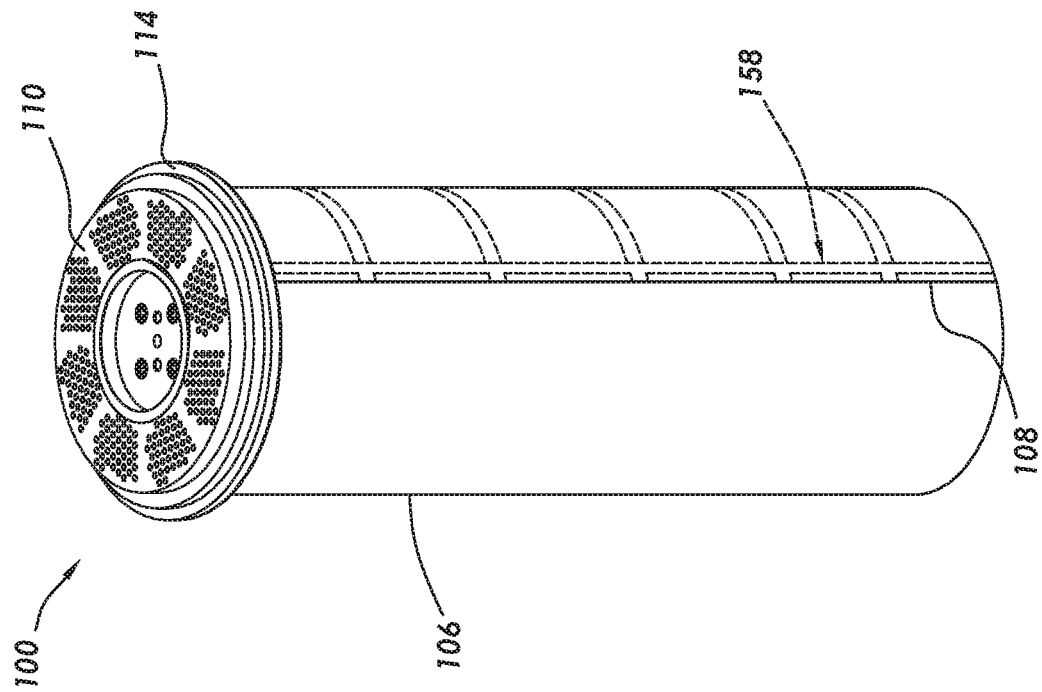

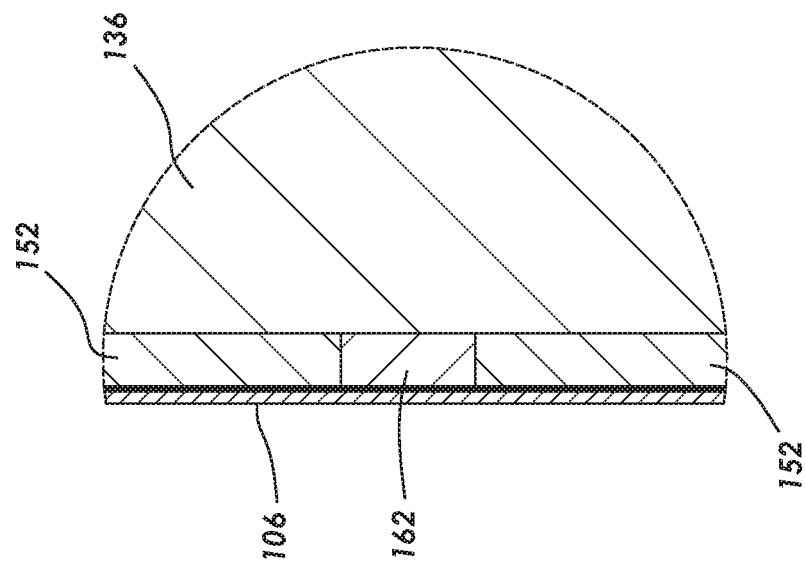
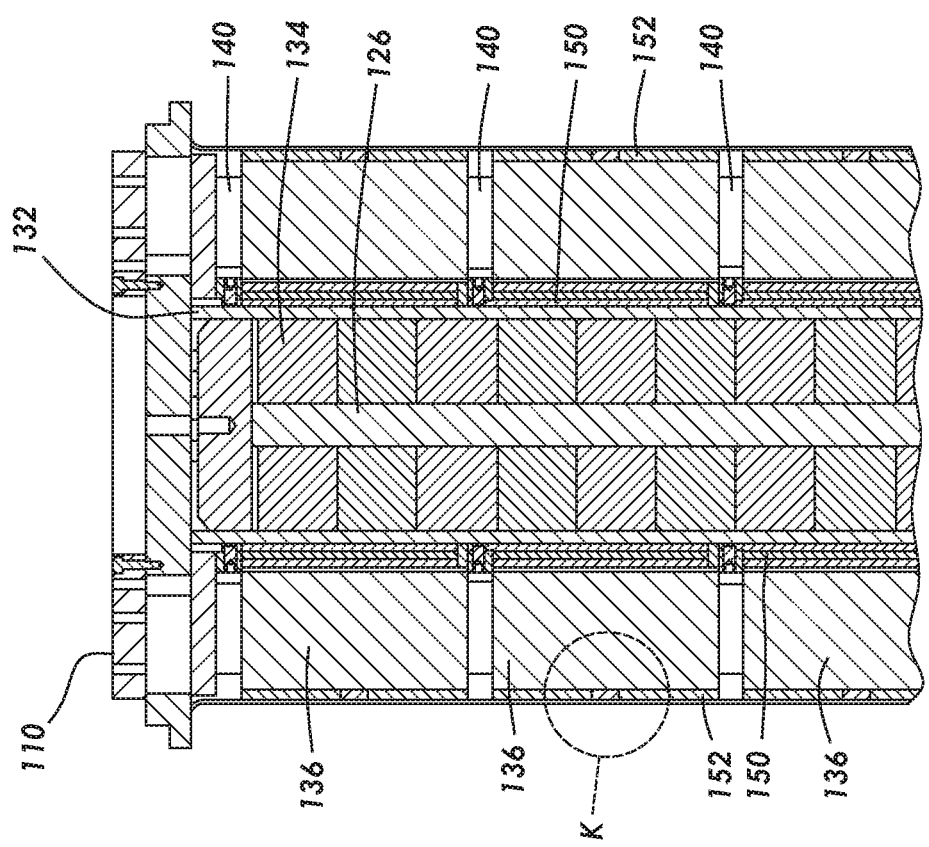

RAPID CYCLE ADSORBENT BED

CROSS REFERENCE TO RELATED APPLICATION

This application claims the priority of U.S. Provisional Application No. 62/840,770 filed Apr. 30, 2019, the disclosure of which is incorporated herein by reference in its entirety.

FIELD

The present disclosure relates to rapid cycle adsorbent beds, systems and assemblies including the same, and methods of making and using the same.

BACKGROUND

Cycle swing adsorption processes, including rapid cycle swing adsorption processes, are used to separate gas components from gas mixtures using multiple adsorbent beds. These adsorbent beds are generally situated in multiple vessels wherein the adsorbent beds may be structured or unstructured and include at least one adsorbent material. Cycle swing adsorption processes exploit the higher affinity of a gas component within a gas mixture for adsorption onto an adsorbent material relative to the affinity of other gas components within the gas mixture for adsorption onto the adsorbent material. The affinity of a gas component for adsorption onto an adsorbent material may vary with, for example, pressure, temperature, or combinations thereof. Thus, cycle swing adsorption processes utilize variations in pressure (pressure swing adsorption), temperature (temperature swing adsorption), or combinations thereof to selectively facilitate the adsorption of certain gas components from a gas mixture, while selectively avoiding the adsorption of other certain gas components from the gas mixture. The adsorbed gas components are separated from the non-adsorbed gas components. The adsorbed gas components may then be separated from the adsorbent material by varying the conditions within the adsorbent bed. For example, certain gas components have a relatively high affinity for adsorption onto an adsorbent material at relatively high pressures, but have a reduced or eliminated affinity for adsorption onto the adsorbent material at relatively lower pressures. Thus, such adsorbed gas components may be selectively released from the adsorbent material by lowering the pressure. Similar results may be achieved by increases and/or decreases in temperature in temperature swing adsorption processes. The adsorbed gas components and non-adsorbed gas components may then be separately processed, disposed of, stored, transported, or otherwise utilized. Cycle swing adsorption processes may utilize multiple adsorbent beds that cycle through operational stages of adsorption and release, such as high-pressure and low-pressure stages.

In rapid cycle swing adsorption processes, the adsorbent bed is cycled through the operational stages of adsorption and release by rapidly varying a parameter (e.g., pressure and/or temperature) of the system. Rapid cycle swing adsorption processes, including temperature swing adsorption (TSA), pressure swing adsorption (PSA), and other variations and combinations thereof, may be used to separate gas components from gas mixtures. Rapid cycle swing adsorption processes are attractive, in part, due to the reduced mass of adsorbent required compared to conventional cycle swing adsorption processes. The reduced adsorbent mass yields significantly smaller pressure vessels and a smaller overall footprint area compared to conventional swing adsorption processes. In rapid cycle swing adsorption processes, adsorbent material is deployed in a bed that includes numerous (e.g., thousands) of relatively small, structured, adsorbent-containing channels that maximize surface area for contact between the gas mixture and the adsorbent, while minimizing pressure loss through the adsorbent bed.

Rapid cycle adsorbent beds may be constructed of multiple adsorbent modules packaged together into an adsorbent bed assembly. Designers of such adsorbent bed assemblies are confronted with numerous difficulties to ensure that the adsorbent bed assembly simultaneously: (1) is structurally strong enough to withstand cyclic fatigue stresses due to reversing cyclical differential pressures during operations; (2) is sufficiently structurally compliant to be capable of being subject to cyclic thermal fatigue stresses during operations; (3) has a minimum amount of dead volume within and outside the adsorbent bed assembly; (4) is capable of maintaining pre-load on individual adsorbent modules to prevent movement and associated impacts from reversing loads and to keep the modules from telescoping; (5) has minimum heat losses to the supporting structure and to elements external to the bed; and (6) meets relatively tight dimensional tolerances.

BRIEF SUMMARY

One aspect of the present disclosure includes an adsorbent bed assembly for separation of gaseous mixtures. The assembly includes a body. The body at least partially defines an interior cavity. The body includes an outer shell; a first end engaged with the outer shell, including a first input/output in fluid communication with the interior cavity; a second end engaged with the outer shell, including a second input/output in fluid communication with the interior cavity; and a central support structure positioned within the interior cavity and coupled with the first and second ends and extending therebetween. A plurality of anti-telescoping devices are positioned about the central support structure. At least one of the anti-telescoping devices is affixed to the central support structure. Each anti-telescoping device includes a plurality of spokes extending within the interior cavity from or proximate the central support structure towards the outer shell.

Another aspect of the present disclosure includes a rapid cycle swing adsorption process. The process includes providing an adsorbent bed assembly. The adsorbent bed assembly includes a body, the body at least partially defining an interior cavity; a central support structure positioned within the interior cavity and coupled with the body; and a plurality of anti-telescoping devices positioned about the central support structure. At least one of the anti-telescoping devices is affixed to the central support structure. Adsorbent material is positioned within the internal cavity. The process includes passing a gas containing at least a first component and a second component through an input of the adsorbent bed assembly, passing the gas through the adsorbent material, and selectively adsorbing the first component on the adsorbent material. The process includes expelling the gas, enriched in the second component and depleted in the first component, from the adsorbent bed assembly.

Another aspect of the present disclosure includes a method of coupling two components subjected to cyclic thermal or pressure loads. The method includes coupling a first rigid component to a second rigid component via at least one setscrew. At least one friction pad is positioned on the second component, between the second component and the first component. The at least one setscrew engages within the at least one friction pad.

BRIEF DESCRIPTION OF THE DRAWINGS

So that the manner in which the features of the compositions, articles, systems and methods of the present disclosure may be understood in more detail, a more particular description briefly summarized above may be had by reference to the embodiments thereof which are illustrated in the appended drawings that form a part of this specification. It is to be noted, however, that the drawings illustrate only various exemplary embodiments and are therefore not to be considered limiting of the disclosed concepts as it may include other effective embodiments as well.

FIG. 1 is a side view of an adsorbent bed assembly in accordance with certain aspects of the present disclosure.

FIG. 2A is a top view of the adsorbent bed assembly of FIG. 1.

FIG. 3 is a bottom view of the adsorbent bed assembly of FIG. 1.

FIG. 5 is a view of detail A of FIG. 4.

FIG. 6 is a view of detail B of FIG. 4.

FIG. 7 is a view of detail C of FIG. 4.

FIG. 8 is a view of detail D of FIG. 4.

FIG. 9 is a view of detail E of FIG. 4.

FIG. 10 is an isometric view of the adsorbent bed assembly of FIG. 1.

FIG. 11 is another top view of the adsorbent bed assembly of FIG. 1.

FIG. 28 depicts a portion of the adsorbent bed assembly.

FIG. 29 depicts a detail view of the adsorbent bed assembly, showing the sealant on the outer diameter thereof.

Figure 2B:
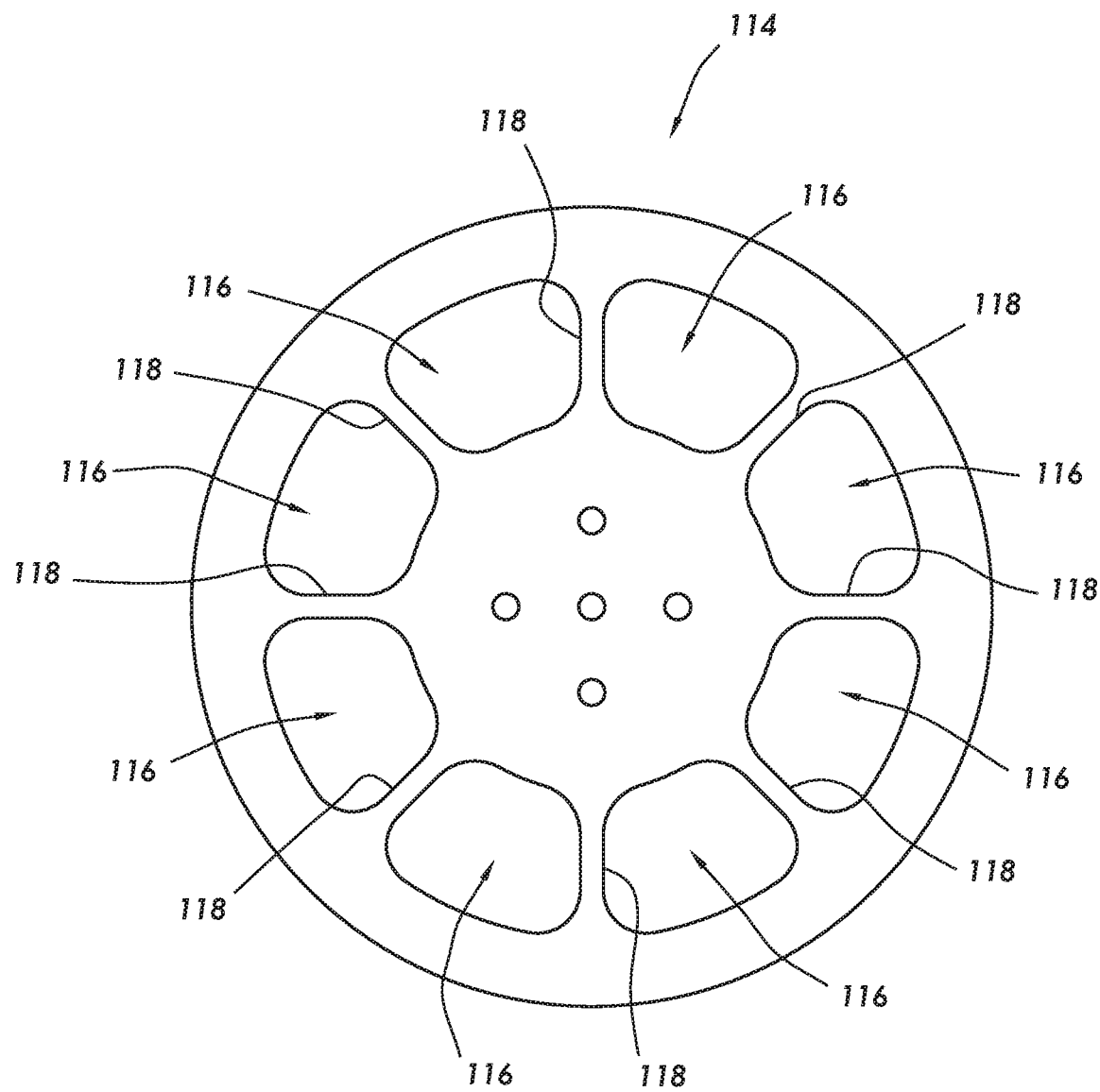
FIG. 2B is a cross-sectional view of the adsorbent bed assembly of FIG. 1, showing a top flange thereof.

Compositions, articles, apparatus, systems, and methods according to present disclosure will now be described more fully with reference to the accompanying drawings, which illustrate various exemplary embodiments. Concepts according to the present disclosure may, however, be embodied in many different forms and should not be construed as being limited by the illustrated embodiments set forth herein. Rather, these embodiments are provided so that this disclosure will be thorough as well as complete and will fully convey the scope of the various concepts to those skilled in the art and the best and preferred modes of practice.

DETAILED DESCRIPTION

The present disclosure includes rapid cycle adsorbent methods, systems, apparatus, beds, and assemblies thereof, including methods of making and using the same.

Adsorbent Bed Assembly—Exterior

FIG. 1 is a side view of one exemplary adsorbent bed assembly. Adsorbent bed assembly 100 is a cylindrical or generally cylindrical structure which may be installed in a vertical orientation (i.e., the orientation shown in FIG. 1) within a pressure vessel during gas separation operations. While shown and described as a cylindrical or generally cylindrical structure, the adsorbent bed assembly disclosed herein is not limited to being cylindrical or generally cylindrical in shape.

Adsorbent bed assembly 100 includes first input/output 102 and second input/output 104. In operation, gas may flow into first input/output 102, pass through adsorbent material contained within adsorbent bed assembly 100, and flow out of second input/output 104; or gas may flow into second input/output 104, pass through adsorbent material contained within adsorbent bed assembly 100, and flow out of first input/output 102.

Adsorbent bed assembly 100 includes outer canister or shell 106, such as a stainless-steel shell (e.g., 316 SS), defining an exterior thereof, and defining the interior space within which adsorbent material and other components of adsorbent bed assembly 100 are or may be positioned. In some aspects, shell 106 is a seam welded metal canister, including at least one seam weld 108. In some aspects, seam weld 108 is positioned between two spokes of an anti-telescoping device (shown and described in more detail below).

Distributor Plates

With reference to FIGS. 1 and 2A, adsorbent bed assembly 100 includes top distributor plate 110. Top distributor plate 110 may receive gaseous input for passage within adsorbent bed assembly 100 and contact with the adsorbent material therein, or may expel gaseous output for passage out of adsorbent bed assembly 100 after contact with the adsorbent material therein. For example, top distributor plate 110 may include a plurality of holes 112 through which gaseous feed or gaseous product may pass. Top distributor plate 110 may be fastened or otherwise coupled to a top flange 114. As shown in FIG. 2B, top flange 114 may be a spoked plate. Between adjacent spokes 118 of top flange 114 are spaces 116, which at least partially define the space within which gas flows. Each group of holes 112 is positioned above one of spaces 116 to direct gas therein or allow gas to flow therefrom.

With reference to FIGS. 1 and 3, adsorbent bed assembly 100 includes bottom distributor plate 120. Bottom distributor plate 120 may receive gaseous input for passage within adsorbent bed assembly 100 and contact with the adsorbent material therein, or may expel gaseous output for passage out of adsorbent bed assembly 100 after contact with the adsorbent material therein. For example, bottom distributor plate 120 may include a plurality of holes 122 through which gaseous feed or gaseous product may pass. Bottom cap 124 is coupled over bottom distributor plate 120, retaining the position of bottom distributor plate 120.

In some aspects, distributor plates 110 and 120 are or include a dimensionally stable, low coefficient of thermal expansion (CTE) metal alloy (e.g., a nickel-iron alloy) or other material, such as INVAR™ (also referred to as FeNi36 or 64FeNi or Nilo 36 or INVAR™ 36).

In some aspects, distributor plate 110 and top flange 114 form a first end of a body of adsorbent bed assembly 100, and distributor plate 120 and bottom cap 124 form a second end of the body of adsorbent bed assembly 100.

Adsorbent Bed Assembly—Internal Components

Figure 4:
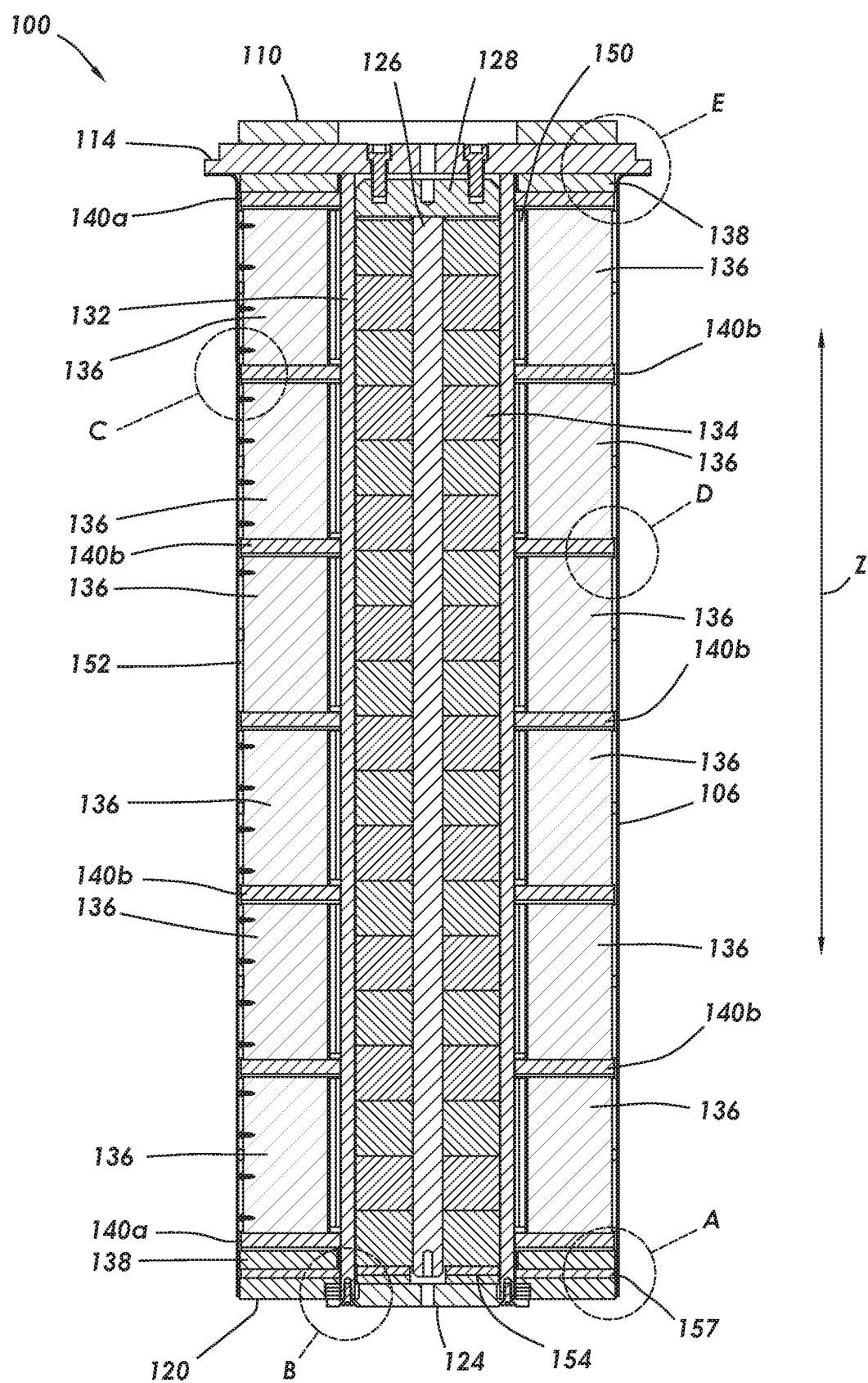
FIG. 4 is a cross-sectional view of the adsorbent bed assembly of FIG. 1 along line A-A.

With reference to FIG. 4, as well as to the detailed views thereof shown in FIGS. 5-9, certain internal components positioned within shell 106 of adsorbent bed assembly 100 are shown and described. Line A-A of FIG. 1 defines a longitudinal centerline of adsorbent bed assembly 100.

Central Post and Pipe

Adsorbent bed assembly 100 includes central post 126, which is centrally located within adsorbent bed assembly 100 and extends from a location proximate bottom cap 124 to a location proximate top cap 128. Central post 126 may be a rigid structure (e.g., steel pipe or rod). Top cap 128 is engaged with and/or coupled with top flange 114, and top flange 114 and bottom cap 124 are both coupled, at opposite ends, to central pipe 132, which may be a rigid structure (e.g., steep pipe). Top cap 128 is engaged with central pipe 132. In some embodiments, top cap 128 is welded to or otherwise coupled with central pipe 132.

Adsorbent bed assembly 100 is at least partially supported by structural, top flange 114 coupled with rigid, central pipe 132. While structural, top flange 114 is shown and described as being positioned at the uppermost end of adsorbent bed assembly 100 (in the z-direction), in other aspects such a structural flange is positioned at the bottom end of adsorbent bed assembly 100, such that the orientation of adsorbent bed assembly 100 is reversed in the z-direction relative to the orientation shown in FIG. 1. In some aspects, top flange 114 is in the form of a spoked device. In certain aspects, structural, top flange 114 is or includes a dimensionally stable, low coefficient of thermal expansion (CTE) metal alloy (e.g., a nickel-iron alloy) or other material, such as INVAR™. Structural, top flange 114 may be integral with, welded to, or otherwise coupled with central pipe 132. Central pipe 132 provides a central support structure of adsorbent bed assembly 100. In some aspects, outer shell 106, distributor plate 110, top flange 114, distributor plate 120, bottom cap 124, and the central support structure at least partially define a body of adsorbent bed assembly 100. The body at least partially defines an internal cavity of adsorbent bed assembly 100.

Low-Porosity Filler

Central pipe 132 circumferentially surrounds central post 126, such that a space is defined between central pipe 132, central post 126, bottom cap 124, and top cap 128. This space is filled with low-porosity material 134, such as a stack of ceramic discs. With low-porosity material 134, dead volume (i.e., void volume) within the interior of adsorbent bed assembly 100 is minimized or at least reduced.

Central post 126 and low-porosity material 134 both serve to fill void space within central pipe 132. Central post 126 is positioned and held within central pipe 132 by compressible insulation layer 154, which may be in the form of shims configured to prevent central post 126 from moving within the cavity of central pipe 132.

Adsorbent Material

Adsorbent material 136 is positioned between top distributor plate 110, bottom distributor plate 120, shell 106, and central pipe 132. In some aspects, adsorbent material 136 is or includes a coated, wound core.

Figure 24:
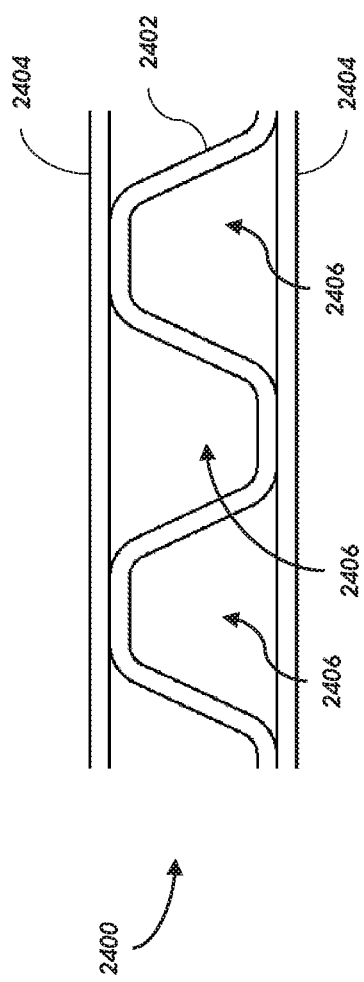
FIG. 24 depicts an uncoated foil construction for use in adsorbent material.
Figure 25:
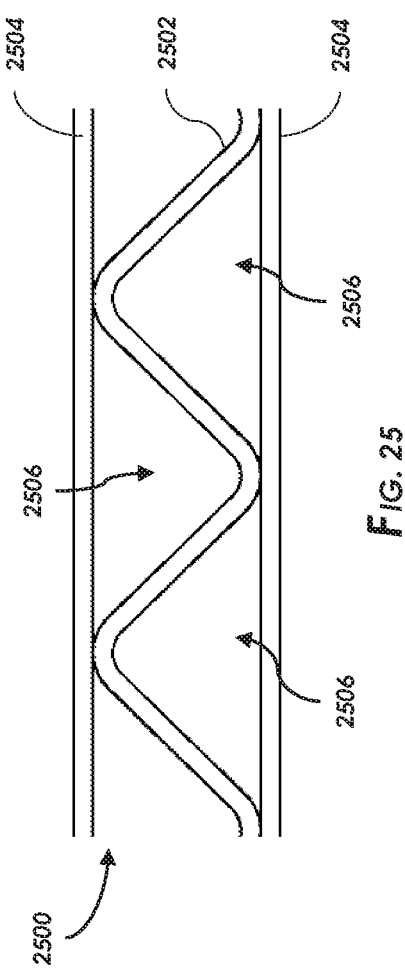
FIG. 25 depicts another uncoated foil construction for use in adsorbent material.
Figure 26:
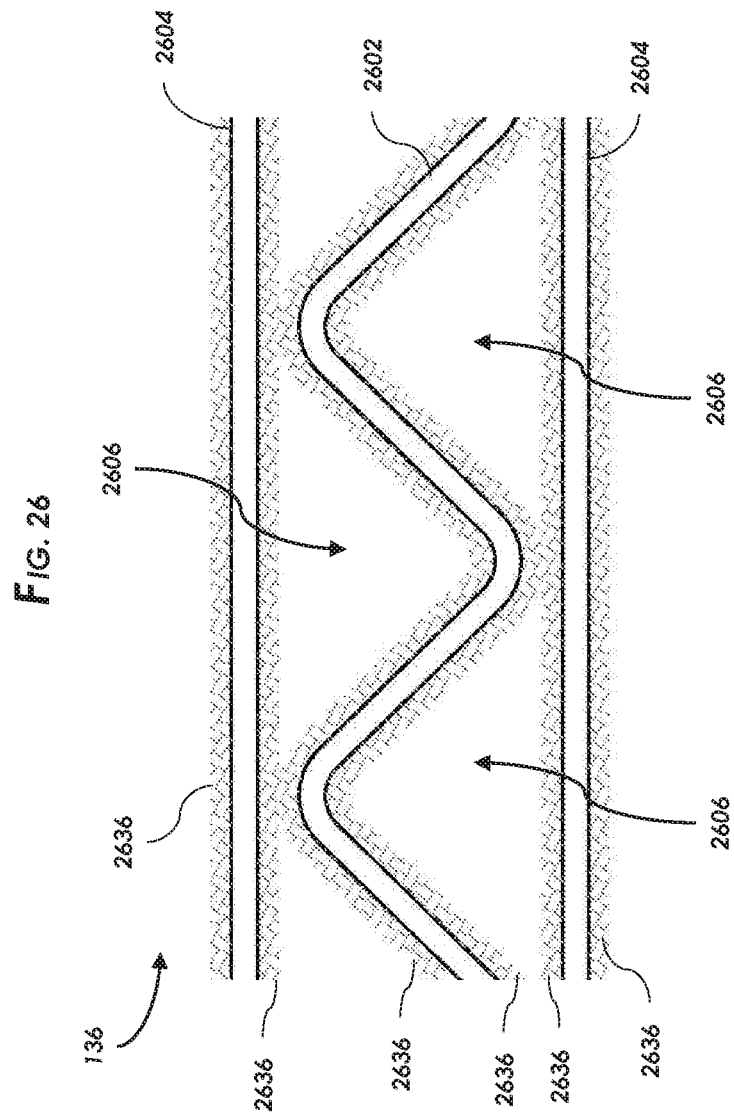
FIG. 26 depicts a coated foil construction for use as adsorbent material.

Adsorbent material 136 may be in the form of a series of adsorbent modules that are arranged axially along central pipe 132. Adsorbent material 136 may be or include adsorbent coated elements, such as adsorbent-coated metal foil and/or adsorbent-coated wire mesh, including corrugated and flat shaped foils or mesh. Adsorbent material 136 may be or include a porous or mesh material having a shape and/or profile that defines channels through which gas flows when passing through adsorbent bed assembly 100. In some such aspects, adsorbent material 136 defines triangular or substantially triangular shaped channels, i.e., adsorbent material 136 having corrugation of a triangular or substantially triangular shape. In some such aspects, adsorbent material 136 defines trapezoidal or substantially trapezoidal shaped channels, i.e., adsorbent material 136 having corrugation of a trapezoidal or substantially trapezoidal shape. FIG. 24 depicts one exemplary uncoated foil construction 2400, which may be coated to form adsorbent material 136. Foil construction 2400 includes one corrugated foil 2402 sandwiched between two flat foils 2404. Corrugated foil 2402 defines trapezoidal-shaped cells 2406 through which gas may flow during adsorption processes. FIG. 25 depicts one exemplary uncoated foil construction 2500, which may be coated to form adsorbent material 136. Foil construction 2500 includes one corrugated foil 2502 sandwiched between two flat foils 2504. Corrugated foil 2502 defines triangular-shaped cells 2506 through which gas may flow during adsorption processes. FIG. 26 depicts an exemplary coated foil construction, substantially similar to that of FIG. 25, but with adsorbent material coating 2636 applied thereto prior to assembly of the foils; thereby, forming adsorbent material 136. Foil construction 2600 includes one corrugated, coated foil 2602 sandwiched between two flat, coated foils 2604. Corrugated, coated foil 2602 defines triangular-shaped cells 2606 through which gas may flow during adsorption processes. Gas flowing through triangular-shaped cells 2606 contacts adsorbent material coating 2636 for adsorption of selected gas thereon. In some aspects, the triangular or substantially triangular-shaped cells are in the shape of isosceles triangles or substantially in the shape of isosceles triangles. While shown as triangular-shaped cells, one skilled in the art would understand that the cells may have other shapes, such as trapezoidal.

Adsorbent material 136 may include one or a plurality of coated elements arranged relative to central pipe 132. In some aspects, the coated element of adsorbent material 136 is arranged as a continuous spiral winding about central pipe 132. In other aspects, coated elements of adsorbent material 136 are arranged as separate, radial or curved elements positioned about central pipe 132.

The foil or mesh serves as a substrate upon which adsorbent material is coated or otherwise attached, such that the foil or mesh at least partially supports the adsorbent material thereon. In some aspects, adsorbent material 136 includes uncoated foil.

In some aspects, adsorbent material 136 is engaged with outer compressible insulation that is positioned on the outer diameter thereof (e.g., layer 152), inner compressible insulation that is positioned on the inner diameter thereof (e.g., layer 150), or combinations thereof. During assembly, inner and outer compressible insulation layers 150 and 152 may be adhered with adsorbent material 136, such as to a surface thereof, to hold adsorbent material 136 in place during the remainder of assembly. After assembly of adsorbent bed assembly 100 is complete, the compression of inner and outer compressible insulation layers 150 and 152 maintains adsorbent material 136 in place within adsorbent bed assembly 100, regardless of the presence of adhesive.

Anti-Telescoping Devices

A plurality of anti-telescoping devices (ATDs) 140a and 140b are positioned within shell 106, between top distributor plate 110 and bottom distributor plate 120. Anti-telescoping devices 140a and 140b may be a structure capable of maintaining pre-loading of the modules of adsorbent material 136 positioned within adsorbent bed assembly 100. As used herein, "telescoping" refers to the deformation of a spiral-wound adsorbent core within an adsorbent assembly such that concentric layers of the spiral-wound adsorbent core material slide against each other and extrude axially (along the z-direction), such that the spiral-wound adsorbent core axially extends similar to an extended telescope. Thus, as used herein, "anti-telescoping devices" are devices that reduce or eliminate the occurrence of such "telescoping".

In some aspects, at least one of anti-telescoping devices 140a and 140b are fixed to center pipe 132. In others aspects, all anti-telescoping devices 140a and 140b are fixed to center pipe 132. In certain aspects, more than one, but less than all, anti-telescoping devices 140a and 140b are fixed to center pipe 132. The location where anti-telescoping devices 140a and 140b are attached to center pipe 132 may be continuously variable along length (z-direction) of center pipe 132 to provide for variable pre-loading of the modules of adsorbent material 136.

In some aspects, one or more of anti-telescoping devices 140a and 140b are free-floating relative to center pipe 132, i.e., the floating anti-telescoping devices 140a and 140b are not fixed to center pipe 132 and are free to move relative thereto in the z-direction. In such aspects, clamping loads are provided by structural ATDs positioned at the ends of center pipe 132. For example, in exemplary adsorbent bed assembly 100, anti-telescoping devices 140a, positioned at the ends of center pipe 132, are structural ATDs affixed to center pipe 132, and intermediate anti-telescoping devices 140b, positioned between the ends of center pipe 132, are floating ATDs. In such aspects, the clamping loads are provided by anti-telescoping devices 140a.

Anti-telescoping devices 140a and 140b may be evenly spaced, relative to one another, between top distributor plate 110 and bottom distributor plate 120. In other aspects, anti-telescoping devices 140a and 140b are unevenly or irregularly spaced, relative to one another, between top distributor plate 110 and bottom distributor plate 120.

Figure 20A:
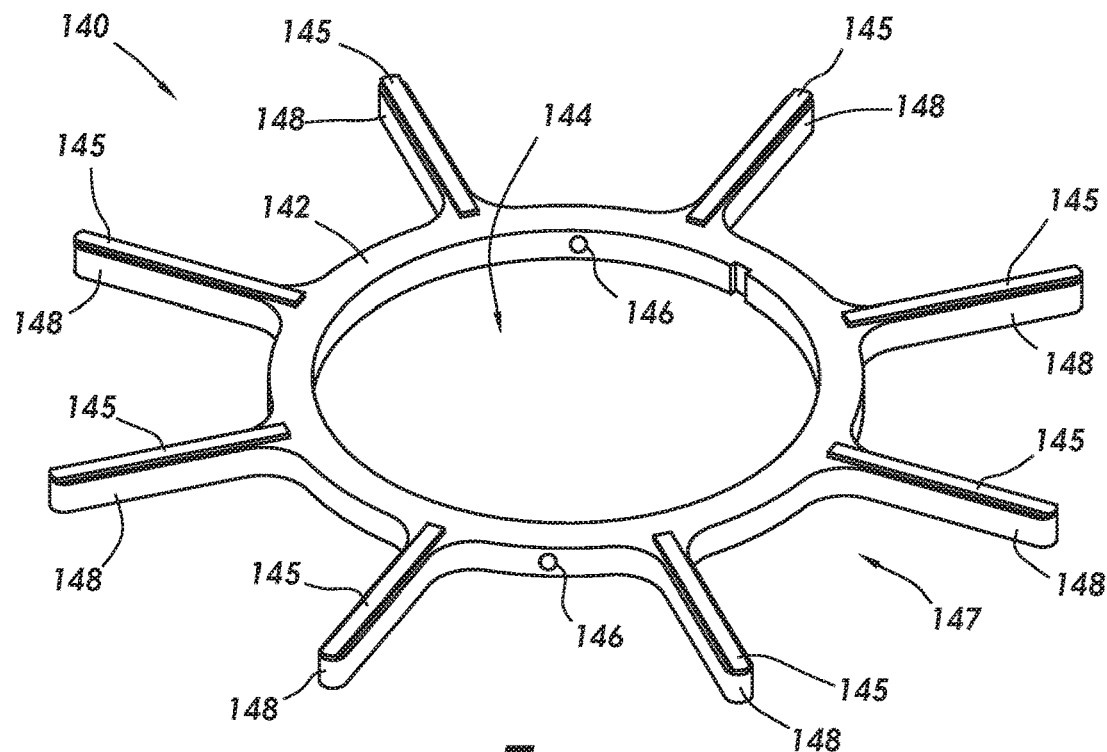
FIG. 20A is an isometric view of an anti-telescoping device, including padding, in accordance with certain aspects of the present disclosure.

With reference to FIGS. 4 and 20A, in some aspects anti-telescoping device includes a ring structure for positioning about the center pipe, and radial spokes that extend from the ring structure towards the shell to engage with adsorbent material. Anti-telescoping device 140 includes inner ring 142. Inner ring 142 may be configured to be positioned about central pipe 132. As shown, inner ring 142 includes central orifice 144. In operation, central pipe 132 may be positioned within orifice 144, such that inner ring 142 circumferentially surrounds central pipe 132. Inner ring 142 may include one or more coupling features for affixing or otherwise coupling inner ring 142 with central pipe 132. As shown, inner ring 142 includes threaded holes 146 for coupling with a fastener, such as a setscrew, for affixing inner ring 142 onto central pipe 132 at the desired position along the z-direction.

Figure 20B:
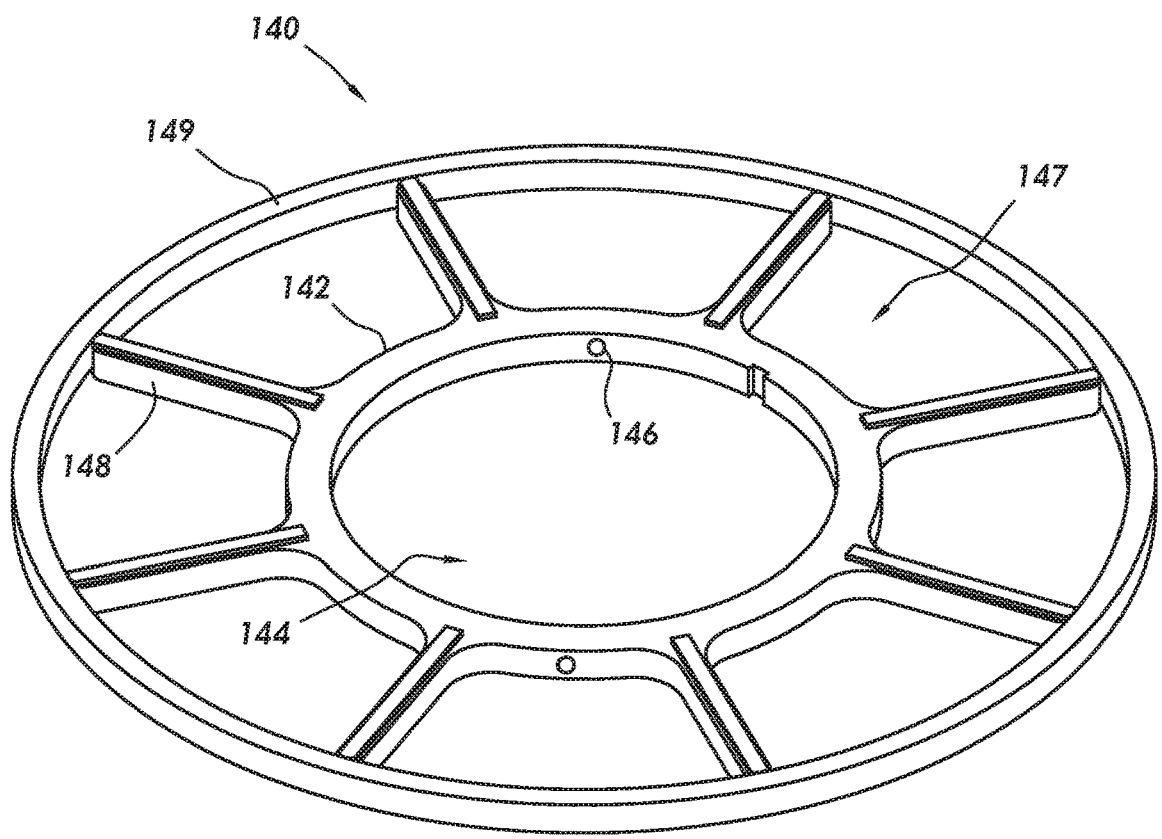
FIG. 20B is an isometric view of an anti-telescoping device including an outer ring.

Anti-telescoping device 140 includes a plurality of radial spokes 148 coupled with and extending from inner ring 142. When installed within adsorbent bed assembly 100, radial spokes 148 may extend outward from inner ring 142 toward shell 106. It is noted that the term "radial spokes" is not limited to embodiments as illustrated in FIGS. 20A and 20B, which is illustrate straight, radially protruding spokes. As used herein, "radial spokes" may also include such configurations as non-straight radial protruding spokes (for example, wherein the spokes have a curvature, such as an "S" shape), and/or intermediate support members, such as an intermediate circular support member or structure connecting the spokes at an intermediate location between the inner ends and the outer ends of the spokes. Radial spokes 148 and inner ring 142 may at least partially define an open space 147 which can allow for redistribution of flow between adjacently mounted adsorbent bed assemblies.

Anti-telescoping device 140 may be composed of or include a structurally rigid material, such as stainless steel. In some aspects, a thermally compliant material is positioned on one or more surfaces of anti-telescoping device 140. For example, as shown in FIG. 20A, each radial spoke 148 includes thermally compliant pad 145 positioned on at least one surface thereof. Thermally compliant pads 145 may be composed of or include a thermally compliant material that is capable of accommodating differential thermal growth between the modules of adsorbent material 136 and the central pipe 132. In some such aspects, the thermally compliant material is a non-metallic material, such as an elastomeric material, that is resilient and flexible. In some such aspects, the thermally compliant material may be an elastomeric material that is covered with a metallic foil to avoid damage to the pad by the sharp surfaces of the adsorbent windings. Thermally compliant pads 145 may be or include a material that remains flexible and resilient, within a broad temperature range. As thermally compliant pads 145 are soft, thermally compliant pads 145 mechanically comply with thermal expansions and contractions of adsorbent material 136 and the surrounding structure.

In one exemplary aspect, the thermally compliant material is composed of an FKM (fluoroelastomer) material, as determined in accordance with ASTM D1418, such as VITON™. In some embodiments, the thermally compliant material is a relatively soft material having a relatively low-elastic modulus (e.g., VITON™), such that that the material can conform to the face of a wound core of adsorbent material, be compressed during preload, and conform to "follow" the thermal expansions and contractions of the wound core. One exemplary thermally compliant material is a 75-durometer grade of VITON™ having an elastic modulus of about 1013 psi at 100% elongation (tensile testing). In some aspects, the thermally compliant material has an elastic modulus of about 525 psi (compression testing). In some embodiments, for the thermally compliant material it may be advantageous under rapid pressure drop conditions to use higher durometer materials, such as DuPont Kalrez™ 7090 (90-durometer), DuPont Kalrez™ 0090 (95-durometer), PPE Endura A90H™ (Aflas type material) (93-durometer), PPE Perlast G92E™ (90-durometer). In preferred embodiments, the thermally compliant material may be an elastomeric material with a durometer of about 70 to 100.

In some aspects, as shown in FIG. 20B, anti-telescoping device 140 includes outer ring 149. In other aspects, as shown in FIG. 20A, anti-telescoping device 140 does not include an outer ring.

Figure 21:
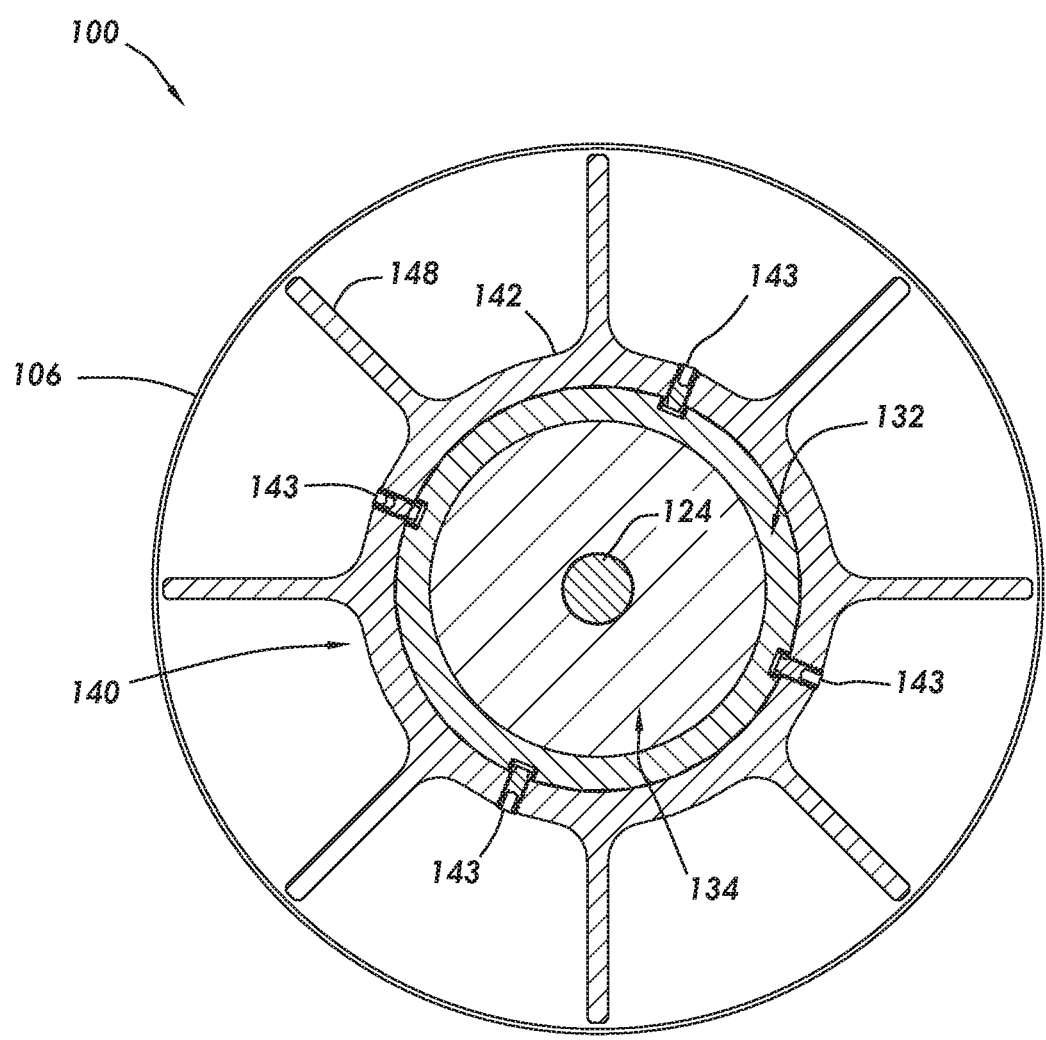
FIG. 21 is a top, cross-sectional view showing connection between the anti-telescoping device and a central pipe of the adsorbent assembly.

With reference to FIG. 21, a cross-sectional view of adsorbent assembly 100 is depicted, showing coupling between anti-telescoping device 140 and central pipe 132. As shown, inner ring 142 is fastened to central pipe 132 via setscrews 143.

Compressible Insulation Layers

In some aspects one or more compressible insulation layers are installed within the adsorbent bed assembly, such as on inner diameter (ID) of the modules of adsorbent material, the outer diameter (OD) of the modules of adsorbent material, or combinations thereof. With reference to FIG. 4, inner compressible insulation layer 150 and outer compressible insulation layer 152 are shown. Inner compressible insulation layer 150 and outer compressible insulation layer 152 may function to minimize heat loss from the modules of adsorbent material 136, to eliminate the occurrence of gas within adsorbent bed assembly 100 from bypassing around the modules of adsorbent material, or combinations thereof. In one exemplary aspect, inner compressible insulation layer 150 and outer compressible insulation layer 152 are or include INTERAM™, by 3M™. Each of inner compressible insulation layer 150 and outer compressible insulation layer 152 may be segmented, rather than one continuous structure extending from the uppermost anti-telescoping device 140 to the lowermost anti-telescoping device. For example, each segment of both inner compressible insulation layer 150 and outer compressible insulation layer 152 may extend between two adjacent anti-telescoping devices 140.

In some aspects, adsorbent bed assembly 100 includes center compressible insulation layer 154. Center compressible insulation layer 154 may be positioned at or proximate to bottom distributor plate 120. For example, center insulation layer 154 may be positioned between bottom cap 124 and low-porosity material 134.

Flow Straightening Structure

With reference to FIGS. 4 and 5, adsorbent bed assembly 100 may include flow straightening structures 138. As shown, flow straightening structures 138 may include a flow straightening structure positioned between bottom distributor plate 120 and adsorbent material 136, inboard of bottom distributor plate 120, as well as a flow straightening structure positioned between top distributor plate 110 and adsorbent material 136, inboard of top distributor plate 110. In operation, when gas flows through one of flow straightening structures 138, either prior to entry into adsorbent material 136 or after exit from adsorbent material 136, flow straightening structures 138 function to straighten the flow of the gas flowing therethrough. Flow straightening structure 138 may be a bed or space where adsorbent material is not disposed, and may include one or more structural features that result in a straightening of the flow of gas therethrough.

Flow straightening structures 138 may be or include foil or mesh without adsorbent material thereon. In some aspects, flow straightening structures 138 are, or include, fine-celled, flat-on-corrugated foils, which are spiral-wound and brazed together. Such brazing provides flow straightening structures 138 with sufficient structural strength to withstand incoming chaotic gas flow, during operations, and to straighten the gas flow out before the gas flow enters into the remainder of adsorbent bed 100, without being damaged by such chaotic gas flow.

Further Internal Component Detail Views

With reference to FIGS. 4-6, 15 and 18, in some embodiments bottom distributor 3o plate 120 includes spokes 157 on an inner surface thereof. Spokes 157 may extend from bottom distributor plate 120 towards adsorbent material 136. In some embodiments, spokes 157 may function to provide space between bottom distributor plate 120 and other internal components of adsorbent bed assembly 100 positioned between bottom distributor plate 120 and top distributor plate 110, such as flow straightening structure 138 and/or adsorbent material 136. Spokes 157 may include structures coupled with or integral with bottom distributor plate 120, that extend from a plane defined by the inner surface of bottom distributor plate 120, with spaces located between adjacent spokes 157. In some embodiments, the spaces located between adjacent spokes 157 are aligned wherewith holes 122. In some embodiments, the number and arrangement of spokes 157 is the same or substantially similar to the number and arrangement of radial spokes 148, such that spokes 157 and radial spokes 148 posited in alignment with one another. While shown and described as radially extending members on bottom distributor plate 120, the spokes may be any structure capable of providing spacing between bottom distributor plate 120 and other internal components of adsorbent bed assembly 100.

With reference to FIG. 6, a detail view of the coupling of bottom cap 124 with central pipe 132 is shown. Bottom cap 124 may be coupled with central pipe 132 via fastener 131. Also shown in FIG. 6 is shim 133 positioned between bottom distributor plate 120 and bottom cap 124.

With reference to FIGS. 7 and 8, detail views of adsorbent material 136 and anti-telescoping device 140 at shell 106 are shown. In some embodiments, fasteners 156 fasten an outer wrap of the adsorbent material 136.

With reference to FIG. 9, a detail view of showing the compression of outer insulation layer 152 to compressed state proximate adsorbent material 136.

Turning now to FIG. 10, an isometric view of adsorbent bed assembly 100 is shown, with a portion of shell 106 made transparent such that backing strip 158 is viewable. Backing strip 158 may be positioned behind seam 108. Backing strip 158 may be or include a relatively thin sheet or foil strip that is positioned beneath weld seam 108. Shell 106 is disposed about outer insulation layer 152, and compresses outer insulation layer 152. In some aspects, outer insulation layer 152 is or includes a relatively soft material (e.g., a soft batt material), backing strip 158 is positioned over outer insulation layer 152 prior to positioning shell 106 about outer insulation layer 152 to prevent shell 106 from pinching outer insulation layer 152 when shell 106 is drawn together at weld seam 108. With backing strip 158 maintaining outer insulation layer 152 out of seam 108, seam 108 is drawn together and welded together without insulation material contaminating weld seam 108. Also, backing strip 158 may thermally insulate outer insulation layer 152 from the welding-heat during formation of seam 108.

Figure 12:
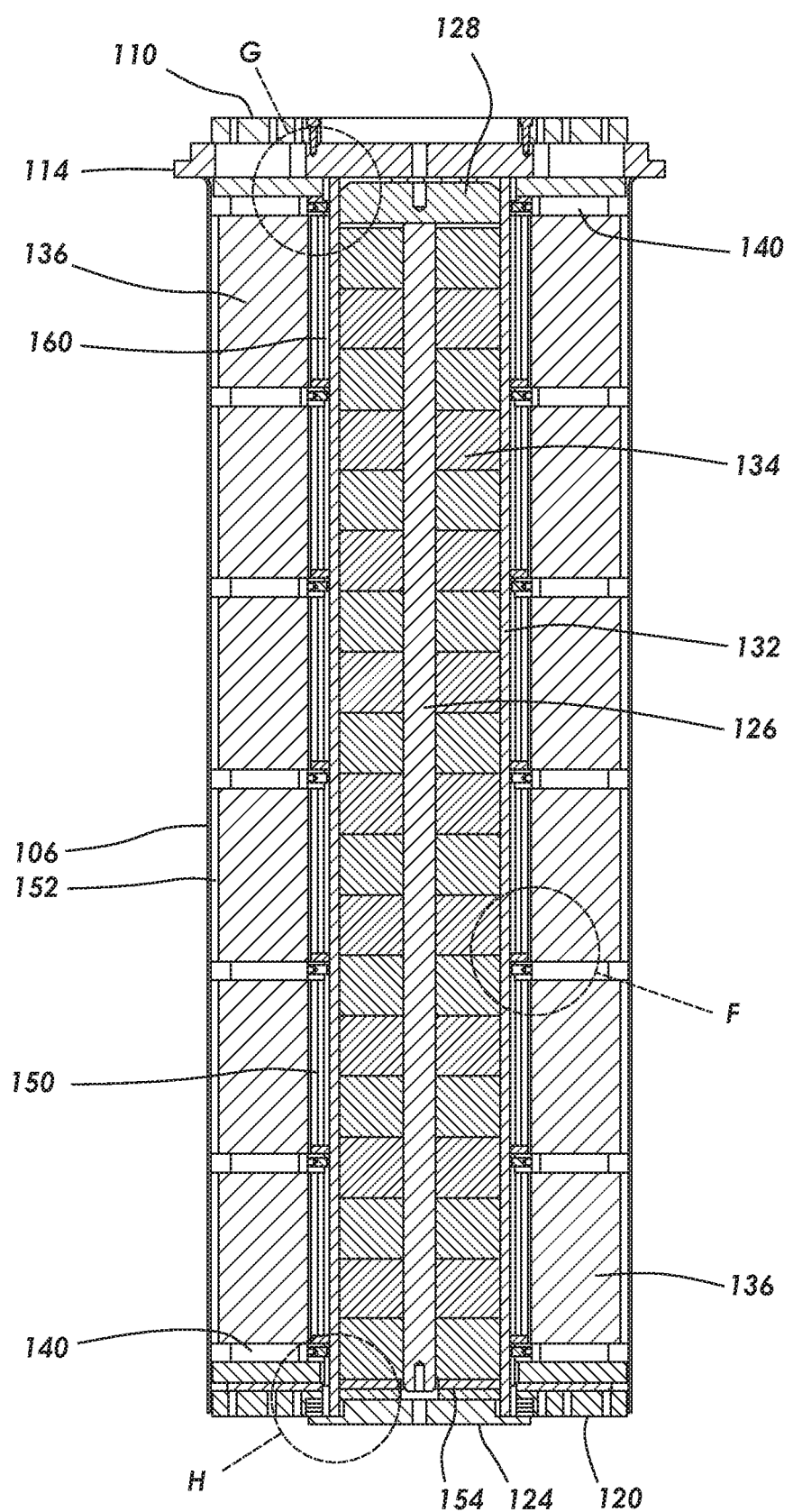
FIG. 12 is a cross-sectional view of the adsorbent bed assembly of FIG. 11, along line Y-Y.
Figure 13:
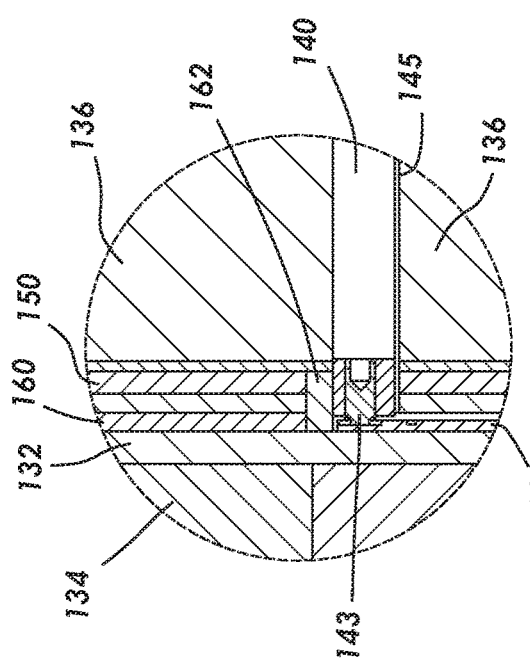
FIG. 13 is a view of detail F of FIG. 12.

FIG. 11 is a top view of adsorbent bed assembly, showing top distributor plate 110 and top flange 114; FIG. 12 is a cross-sectional view of FIG. 11 along line Y-Y; and FIG. 13 is a detail view of section F of FIG. 12.

Sealant

In some aspects, sealant is positioned at the ID of adsorbent material 136, such as at the end of each segment of inner compressible insulation layer 150. With reference to FIGS. 11-13, sealant 162 is positioned between one segment of inner compressible insulation layer 150 and one anti-telescoping device 140. Sealant 162 may serve to ensure that gas flowing through adsorbent bed assembly 100 does not bypass adsorbent material 136. For example, without sealant 162, gaps or insulation porosity at the engagement between anti-telescoping device 140 and inner compressible insulation layer 150 may lead to gas bypass adsorbent material 136 (i.e., not flowing therethrough), and instead flowing through such gaps or insulation porosity. However, the presence of sealant 162 at the interface of anti-telescoping device 140 and inner compressible insulation layer 150 may reduce or eliminate such bypassing. One exemplary sealant is PEL-SEAL™ 6200.

With reference to FIGS. 28 and 29, in some aspects, sealant 162 is positioned adjacent inner compressible insulation layer 150 and outer compressible insulation layer 152. While outer compressible insulation layer 152 is compressed during installation, outer compressible insulation layer 152 may be at least partially porous after installation, which may result in the bypass of at least some gas flow there-through. However, positioning sealant 162 around the outer diameter of adsorbent material 136 reduces or eliminates such bypassing of gas. Sealant 162 may be positioned adjacent outer compressible insulation layer 152 by forming a narrow channel (e.g., by cutting) in the outer diameter of outer compressible insulation layer 152 about the entire perimeter thereof, followed by at least partially filling the narrow channel with sealant 162. In some aspects, masking tape or another retaining structure may be placed over the sealant-filled narrow channel to prevent sealant 162 from flowing out of the narrow channel as the adsorbent bed assembly 100 is rotated and positioned during assembly. Shell 106 may then be clamped over the remainder of adsorbent bed assembly 100 such that the masking tape engages the inside surface of the shell 106. In other aspects, the sealant may be deposited between the outer compressible insulation layer 152 and one of the anti-telescoping devices and at least one of the anti-telescoping devices 140.

Friction Pads

In some aspects, adsorbent bed assembly includes one or more friction pads arranged to allow setscrews to be used to couple anti-telescoping devices 140 with central pipe 132. For example, with reference to FIGS. 12 and 13, friction pads 160 are positioned between central pipe 132 and inner compressible insulation layer 150, as well as between central pipe 132 and anti-telescoping device 140. In operation, friction pads 160 may allow for attachment of setscrew 143 between anti-telescoping device 140 and central pipe 132 and/or friction pads 160. Friction pads 160 allow anti-telescoping device 140 to remain coupled with central pipe 132 and/or friction pads 160 during thermal loads and/or cyclic pressure loads, without deforming central pipe 132 or anti-telescoping device 140 and resulting in deformation of the ends of setscrew 143 and friction pads 160.

Friction pads 160 may be, or include, a material, such as 316 stainless steel, that is corrosion resistant over a relatively wide temperature range. Friction pads 160 may spread load from setscrews 143 to central pipe 132. During assembly, setscrews 143 turn as setscrews 143 are torqued down and clamping force increases, such that setscrews 143 may, to a relatively small degree, deform and/or scratch friction pads 160. During assembly, friction pads 160 may press against central pipe 132 without turning and/or without scratching central pipe 132. As friction pads 160 spread force out onto central pipe 132, the contact pressure between friction pads 160 and central pipe 132 is lower than the contact pressure between setscrews 143 and friction pads 160. The arrangement of setscrews 143 and friction pads 160 allows for anti-telescoping devices 140 to be positioned at will along central pipe 132.

Figure 14:
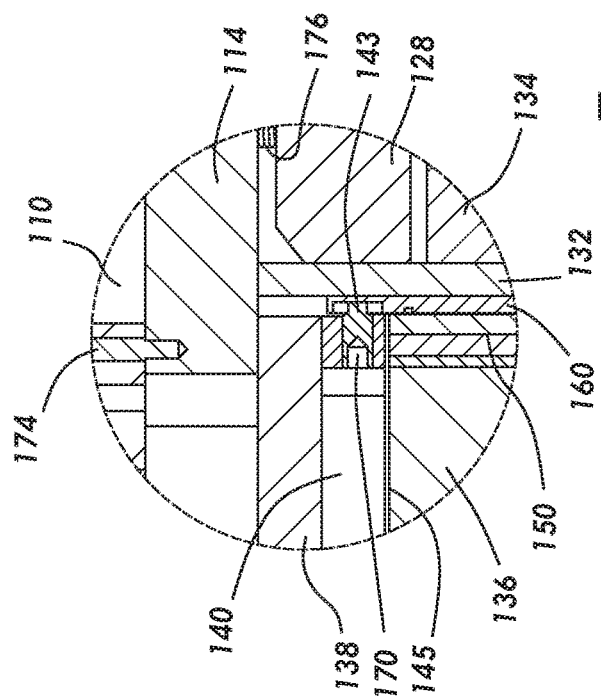
FIG. 14 is a view of detail G of FIG. 12.

With reference to FIGS. 12 and 14, a detail view showing the connection between the uppermost anti-telescoping device 140 and friction pad 160 is shown. Anti-telescoping device 140 may couple with friction pad 160 via a hollow lock setscrew 170 and extended tip setscrew 143. Also shown is fastener 174 coupling top distributor plate 110 with top flange 114, and fastener 176 coupling top flange 114 with top cap 128.

Figure 15:
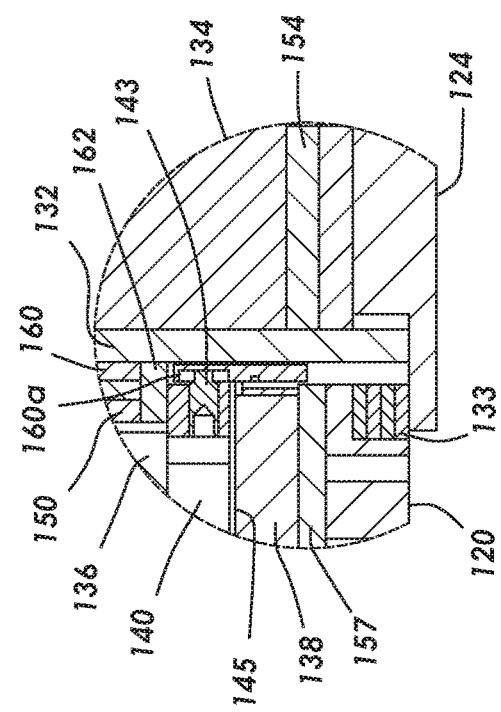
FIG. 15 is a view of detail H of FIG. 12.

With reference to FIGS. 12 and 15, in some aspects, a separate, bottom friction pad 160a is positioned between the bottommost anti-telescoping device 140 and the bottom cap 124.

Figure 17:
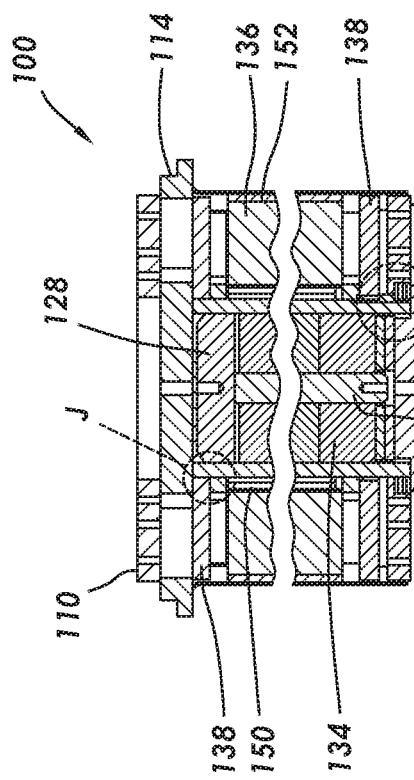
FIG. 17 is a sectional view of the adsorbent bed assembly of FIG. 16, along line C-C.
Figure 19:
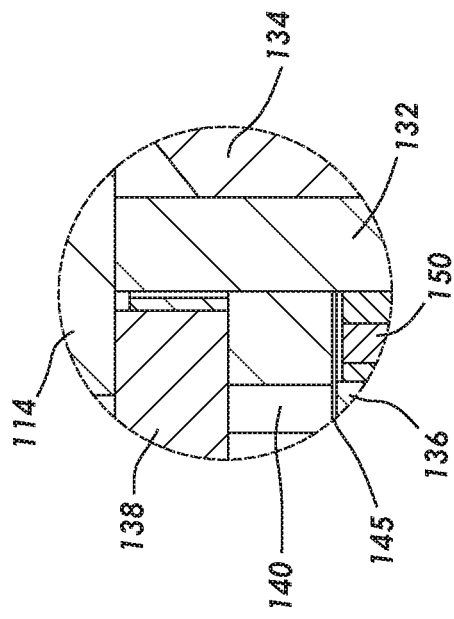
FIG. 19 is a view of detail J of FIG. 17.
Figure 16:
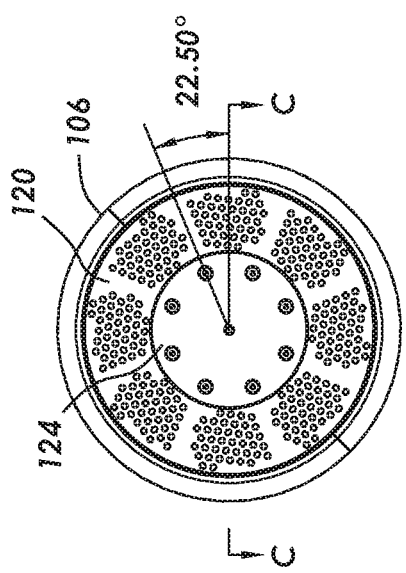
FIG. 16 is another bottom view of the adsorbent bed assembly of FIG. 1.
Figure 18:
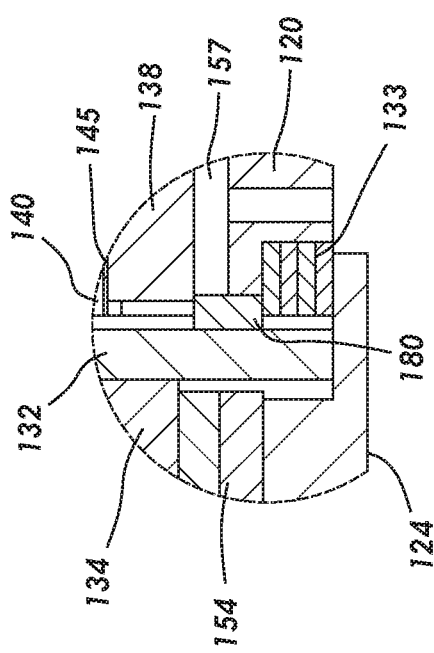
FIG. 18 is a view of detail I of FIG. 17.

FIG. 16 depicts a bottom view of the adsorbent assembly; FIG. 17 depicts truncated portions of a cross-sectional view of FIG. 16 along line C-C; and FIGS. 18 and 19 depict detail views of FIG. 17. FIGS. 16-19, depict additional detail views of adsorbent assembly 100, including key 180 (e.g., stainless steel key) positioned between central insulation layer 150, flow straightening structure 138, bottom distributor plate 120, shim 133, and central pipe 132.

Scalability

The adsorbent bed assembly disclosed herein may be a scalable (e.g. fully scalable) 3o bed assembly, such that the OD of the adsorbent bed assembly, the ID of the adsorbent bed assembly, the length (z-direction) of the adsorbent bed assembly, or combinations thereof are variable depending upon the particular application.

Some aspects of the adsorbent bed assembly disclosed herein that contribute to the scalability of the adsorbent bed assembly include, but are not limited to, the anti-telescoping devices, which may be attached with the central pipe at locations that are variable continuously along the length of the central pipe (in the z-direction).

Structural Rigidity

The adsorbent bed assembly disclosed herein may have structural rigidity and resiliency that is sufficient to handle both static and dynamic pressure loads exerted on the adsorbent bed assembly during use thereof. Some aspects that contribute structural rigidity and resiliency of the adsorbent bed assembly include, but are not limited to, the coupling and arrangement of the top flange, central post, bottom cap, and central pipe. This arrangement and coupling of components of the adsorbent bed assembly provides a rigid skeletal structure that bears pressure loads exerted on the adsorbent bed assembly during use thereof.

Additionally, the anti-telescoping devices provide clamping load to the adsorbent material during operations. The variable attachment locations of the anti-telescoping devices allow for the provision of more precise preloads of the foil or mesh substrate to account for variation in dimensional stack up tolerances of the adsorbent material.

Figure 27:
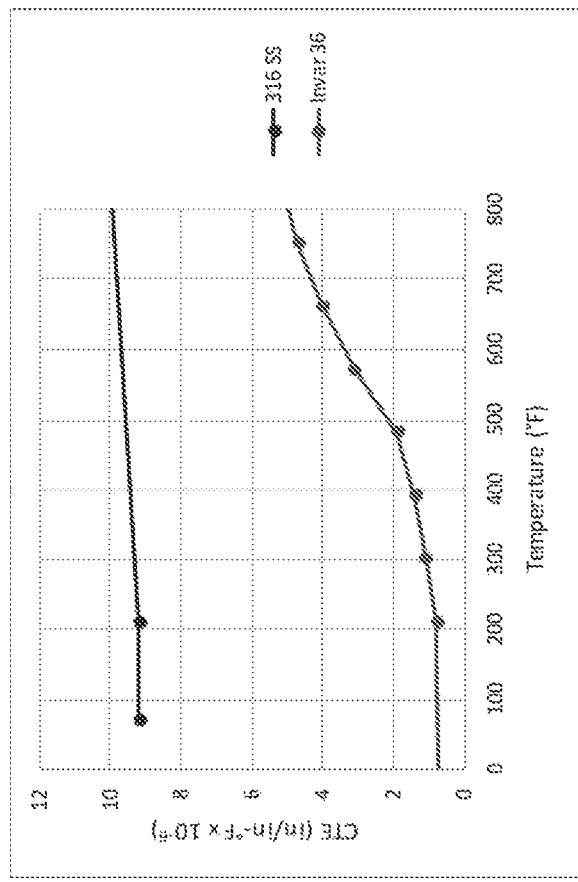
FIG. 27 is a graph comparing the CTE of 316 stainless steel and INVAR™ 36.

In some aspects, the use of a top structural flange, top distributor plate, bottom distributor plate, or combinations thereof formed of a dimensionally stable, low coefficient of thermal expansion (CTE) metal alloy (e.g., a nickel-iron alloy) or other material, such as INVAR™, allows for the adsorbent bed assembly to bear increased levels of internal thermal stresses. The use of INVAR™ or other materials having a low CTE in distributor plates 110 and 120 decreases stresses developed by differential thermal expansion therein. As each distributor plate 110 and 120 may be a relatively thick structural plate with a plurality of perforations therethrough for the passage of gas during adsorption operations, the perforated zone of distributor plates 110 and 120 is subjected to wider temperature swings than the non-perforated solid central portions or outer perimeter portions of distributor plates 110 and 120. Such differential in temperature swings creates greater contractions and expansions in the perforated portions of distributor plates 110 and 120 than in the central and perimeters portions of distributor plates 110 and 120; thereby, creating stress between these different areas of distributor plates 110 and 120. Low CTE materials, such as INVAR™, minimize the contractions and expansions of the perforated portions of distributor plates 110 and 120. In some aspects, adsorbent bed assembly 100 is capable of operation at temperatures of up to 500° F. As is evident from FIG. 27, INVAR™, the lower line in the graph, has a substantially lower CTE than stainless steel, the higher line in the graph, in such a temperature range. As such, the use of INVAR™ or other low CTE materials allows adsorbent bed assembly 100 to manage thermal stresses.

Thermal Compliance

The adsorbent bed assembly disclosed herein may have thermal and/or structural compliance that is sufficient to accommodate the cyclical, thermally induced stresses exerted upon the adsorbent bed assembly during use thereof. Such thermally induced stresses may be caused by rapid temperature cycling within the adsorbent bed assembly.

Some aspects that contribute to the thermal compliance of the adsorbent bed assembly include, but are not limited to, the use of thermally compliant material (e.g., pads 145) on the anti-telescoping devices disclosed herein. Such thermally compliant pads accommodate thermal growth of, for example, the adsorbent material and or other components of the adsorbent bed assembly.

Reduction in Loss of Heat and Occurrence of Bypassing

The adsorbent bed assembly disclosed herein may have a relatively low level of heat loss, relatively low occurrence of gas bypassing the adsorbent material, or combinations thereof. Some aspects that contribute to the low heat loss and/or occurrence of bypassing include, but are not limited to, the use of compressible insulation layers within the adsorbent bed assembly (including adjacent the adsorbent material) and the use of sealants at the ends of at least some of the compressible insulation layers. In some aspects, the shell of the adsorbent assembly is a relatively thin-wall metal canister having an integral flange positioned around the OD of adsorbent bed assembly to compress the outer compressible insulation layer; thereby, reducing or preventing the occurrence of gas bypassing around the adsorbent material. In some aspects, an O-ring, gasket, or other sealing component is positioned at the interface of the structural, top flange and the interior of adsorbent bed assembly, such that the occurrence of gas bypassing around the adsorbent bed assembly is prevented or at least reduced.

Reduction in Dead Volume

The adsorbent bed assembly disclosed herein may have relatively low level of dead volume. Some aspects that contribute to the low level of dead volume include, but are not limited to, the filling of the space between central pipe and central post with low-porosity material, such as ceramic discs.

In some aspects the adsorbent bed assemblies disclosed herein: (1) are structurally strong, rigid, and/or resilient enough to withstand cyclic fatigue stresses due to reversing cyclical differential pressures during operations; (2) are structurally compliant enough to be capable of being subject to cyclic thermal fatigue stresses during operations; (3) have a minimum amount of dead volume within and outside the adsorbent bed assembly; (4) are capable of maintaining pre-load on individual adsorbent modules to prevent movement and associated impacts from reversing loads and to keep the modules from telescoping (e.g., due to the use of the anti-telescoping devices); (5) have minimum heat losses to the supporting structure and to elements external to the bed; (6) meet relatively tight dimensional tolerances; or (7) combinations thereof.

Systems and Methods

Figure 22:
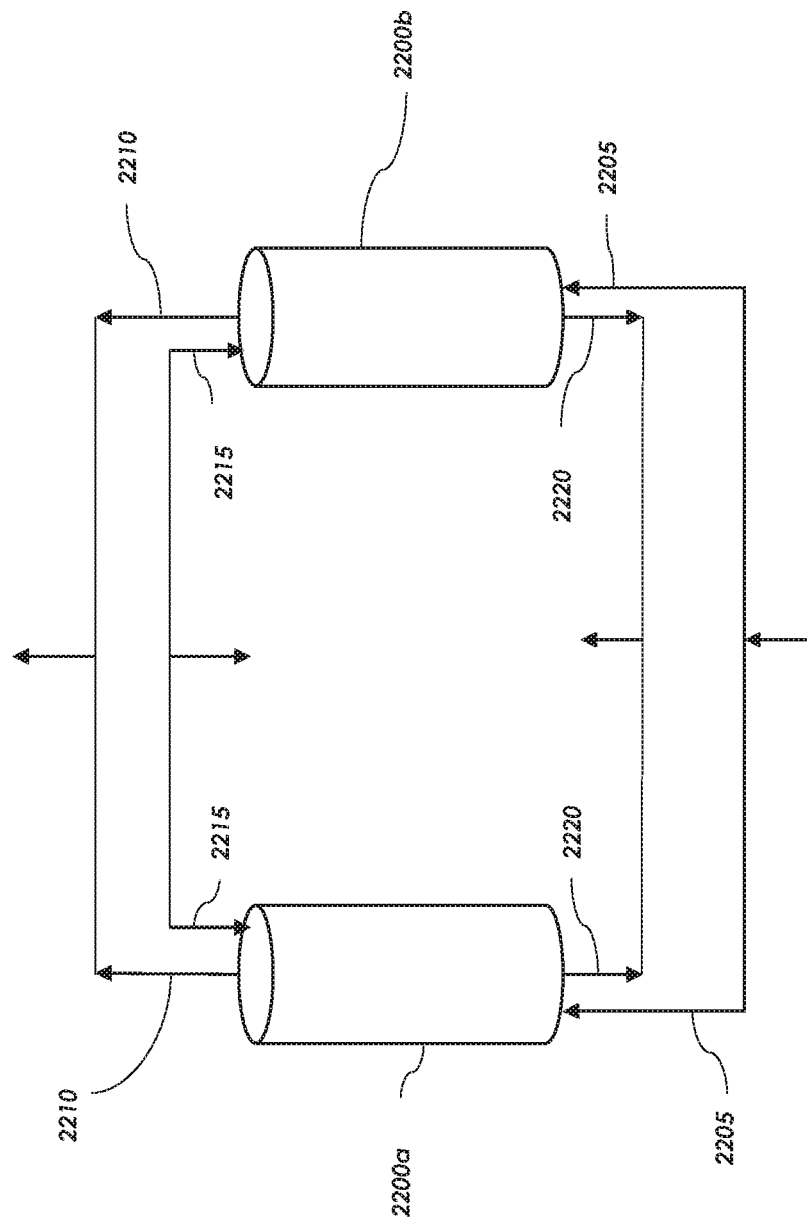
FIG. 22 is a simplified schematic of a system including two adsorbent bed assemblies.

Certain aspects of the present disclosure include systems including the adsorbent bed assemblies disclosed herein, and to methods of using the adsorbent bed assemblies disclosed herein. A single or multiple of the adsorbent bed assemblies disclosed herein may be packaged within a single pressure vessel for use thereof. With reference to FIG. 22, a simplified schematic representing such a system and process is shown showing only two adsorbent beds. Each adsorbent bed may be or include an adsorbent bed assembly as described herein. In FIG. 22, each of the two adsorbent bed assemblies 2200a and 2200b may be positioned within a pressure vessel (not shown). Adsorbent bed assemblies 2200a and 2200b may be any of the adsorbent bed assemblies disclosed herein, such as those shown and described with reference to FIGS. 1-21.

The two adsorbent bed assemblies 2200a and 2200b (or "beds" herein with description to FIG. 22) are configured in fluid communication utilizing a piping network and manifolds equipped with an arrangement of directional valves (not shown) interconnecting the two beds. The system is operable as a closed fluid system and each bed includes a feed gas inlet 2205 that directs a gaseous feed stream to one or both of the beds, and a product gas outlet 2210 for outputting a product stream passed through the bed. Each bed also includes purge gas inlet 2215 and a purge gas outlet 2220. Each of these individual inlet and outlet streams from the respective beds may be manifolded such as shown in the simplified schematic of FIG. 22. For the sake of simplicity, valving and other equipment and/or machinery are not illustrated in the figure.

As shown in the embodiment of FIG. 22, adsorbent bed assemblies 2200a and 2200b are operated in parallel. In operation, a gaseous feed stream is passed through the adsorbent bed assemblies 2200a and 2200b from end to end in various steps or stages of the process.

In the pressure swing adsorption process, the two adsorbent bed assemblies may be operated through identical swing adsorption process cycles. These cycles in the two adsorbent beds may be simultaneous, or they may be staggered. For instance, adsorbent bed 2200a and adsorbent bed 2200b may both go through an adsorption step at the same time, or for instance, adsorbent bed 2200a may go through an adsorption step while adsorbent bed 2200b is going through a regeneration step. FIG. 22 reflects a PSA operation where the two adsorbent bed assemblies 2200a and 2200b are one half-cycle out of phase (i.e., 180 degrees out of phase), with adsorbent bed assembly 2200a operating in adsorption mode and adsorbent bed assembly 2200b operating in regeneration mode. In adsorption mode, a gaseous feed stream enters one end of adsorbent bed assembly 2200a at the feed gas inlet 2205 at a first pressure and first temperature and passes through the adsorbent bed assembly and a product stream is retrieved from the product gas outlet 2210. This step will include passing a gaseous feed stream containing at least a first component and a second component through an input of the adsorbent bed assembly; passing the gas through an adsorbent material in the adsorbent bed assembly and selectively adsorbing the first component by the adsorbent material; and expelling a product stream, the product stream enriched in the second component and depleted in the first component, from the adsorbent bed assembly.

In this example, with adsorbent bed assembly 2200a and adsorbent bed assembly 2200b operating half-cycle out of phase, a gaseous purge gas inlet stream enters one end of adsorbent bed assembly 2200b at the purge gas inlet 2215 at a second pressure and second temperature and passes through the adsorbent bed assembly and a gaseous purge gas outlet stream is retrieved from the purge gas outlet 2220. This step is utilized to desorb the selectively adsorbed first component of the gaseous feed stream from the adsorbent material. Generally, this purge step is performed at a lower pressure than the adsorption step. In addition to utilizing a pressure swing to desorb the first component of the gaseous feed stream from the adsorbent material, a temperature swing step may also be utilized in conjunction with, or in series with, the pressure swing step(s). This may be accomplished, by way of example, by utilizing a purge gas stream that is higher in temperature than the temperature of the adsorbent material following the adsorption step.

It should also be noted that more than two adsorbent beds or adsorbent bed assemblies may be utilized in a pressure swing process utilizing the adsorbent bed assemblies disclosed herein. Additionally, the regeneration step may alternatively encompass multiple purge steps (each performed with a different pressure, temperature and/or purge stream composition) as well as encompass additional steps besides just a purge step. Additional steps that may be included in the regeneration cycle are discrete depressurization step(s) as well as re-pressurization step(s).

The methods disclosed herein may be applied to, for example, rapid cycle pressure swing adsorption (RCPSA) and rapid cycle partial pressure swing adsorption (RCPPSA), which may be combined with other swing adsorption processes, such as pressure/temperature swing adsorption processes. Some exemplary kinetic swing adsorption processes are described in U.S. Patent Application Publication Nos. 2008/0282892, 2008/0282887, 2008/0282886, 2008/0282885, and 2008/0282884, which are each herein incorporated by reference in their entirety. Exemplary swing adsorption systems are described in United States Patent Application Publication Nos. 2011/0291051; 2013/0327216; and 2013/0061755, and in Intl. Application Publication Nos. 2011/149640; 2012/118755; and 2012/118758; and 2016/0023155, which are each herein incorporated by reference in their entirety.

RCPSA processes generate flow disturbances caused by pressure differences during certain transitions within a vessel (adsorbent bed assembly). For example, when a vessel in an RCPSA system transitions from a high-pressure stage, such as an adsorption stage, to a low-pressure stage, such as a regeneration stage, by blowing-down (BD) through a purge valve, flow disturbances (e.g., pulsations) may be caused by the pressure differential across the purge valve. Also, when a vessel in an RCPSA system transitions from a low-pressure stage, such as a purge stage, to a high-pressure stage, such as an adsorption stage, which includes re-pressurization (RP), flow disturbances may be caused by the pressure differential across the feed valve. Typically, several such vessels are manifolded together to allow for a continuous flow from all vessels. The various stages or steps within the multiple, manifolded vessels are overlapped to maintain continuous flow in the overall system. Such flow disturbances may result in vibrations throughout the system (e.g., within manifold piping), and stress on system components, including the internal components of the vessels. As described above, the adsorbent bed assemblies disclosed herein may be capable of handling such pressure and/or temperature stresses.

Figure 23:
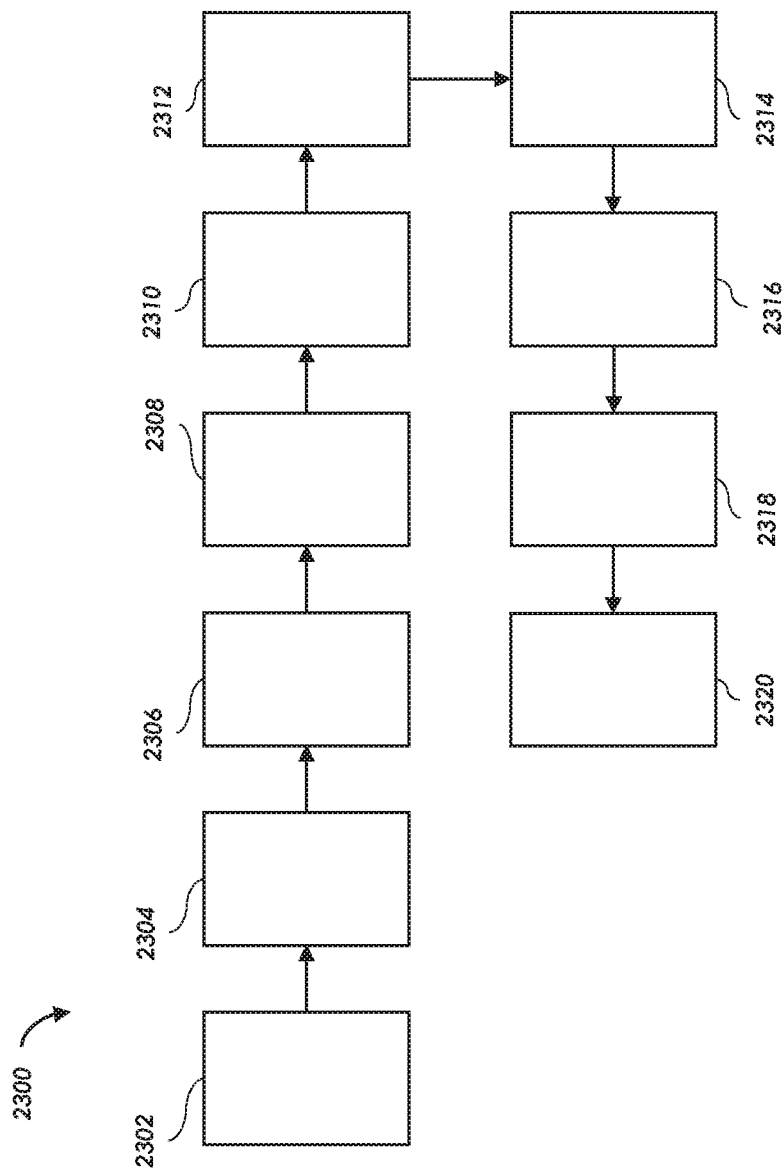
FIG. 23 is a simplified flow chart of a process of using the adsorbent bed assemblies disclosed herein.

FIG. 23 depicts one, simplified flow chart of a method of using the adsorbent bed assemblies disclosed herein. Method 2300 includes passing a gas containing at least a first component and a second component through a distributor plate of an adsorbent bed assembly, 2302.

Method 2300 includes passing the gas through a flow straightening structure; thereby, straightening the flow of the gas, 2304.

Method 2300 includes passing the gas through adsorbent material, and adsorbing the first component on the adsorbent material, 2306.

Method 2300 includes, during adsorption, bearing at least some pressure load with the top flange, central post, bottom cap, and central pipe of the adsorbent bed assembly, 2308.

Method 2300 includes, during adsorption, providing clamping load to the adsorbent material using anti-telescoping devices positioned within the adsorbent bed assembly, 2310.

Method 2300 includes, during adsorption, accommodating for thermal expansion of adsorbent material or other components of the adsorbent bed assembly using thermally compliant pads positioned on the anti-telescoping devices, 2312.

Method 2300 includes reducing heat loss from the adsorbent bed assembly by positioning compressible insulation layers within the adsorbent bed assembly and positioning sealants at the ends of at least some of the compressible insulation layers, 2314.

Method 2300 includes reducing dead volume of the adsorbent bed assembly by filling void space within the adsorbent bed assembly with ceramic discs, 2316.

Method 2300 includes expelling the gas, enriched in the second component and depleted in the first component, from the adsorbent material and through a flow straightening structure, where the flow of the expelled gas is straightened, 2318.

Method 2300 includes expelling the gas from a distributor plate of the adsorbent bed assembly, 2320.

Method 2300 is provided for exemplary purposes only. The method of use of the adsorbent bed assemblies disclosed herein is not limited to including each step of method 2300, and is not limited to the particular order of steps set forth in method 2300.

Additional Adsorbent Materials

The adsorbent materials used herein may include solid adsorbent material capable of adsorbing one or more components from the feed stream. Such solid adsorbent materials may be selected to be durable against the physical and chemical conditions within the adsorbent bed assemblies, and may include metallic, ceramic, or other materials, depending on the adsorption process.

In one or more applications, the adsorption material may be used for the separation of a target gas from a gaseous mixture. The adsorption material may be supported on a non-adsorbent support, or contactor. Non-limiting examples of the form of the adsorbent material include beds of beaded or pelletized adsorbent particles or an adsorbent material on a structured contactor, such as a parallel channel contactor. Such contactors contain substantially parallel flow channels where 20 volume percent, preferably 15 volume percent or less of the open pore volume of the contactor, excluding the flow channels, is in pores greater than about 20 angstroms. A flow channel is that portion of the contactor in which gas flows, if a steady state pressure difference is applied between the point or place at which a feed stream enters the contactor and the point or place at which a product stream leaves the contactor. In a parallel channel contactor, the adsorbent is incorporated onto and/or into the wall of the flow channel Non-limiting examples of geometric shapes of parallel channel contactors include various shaped monoliths having a plurality of substantially parallel channels extending from one end of the monolith to the other; a plurality of tubular members, stacked layers of adsorbent sheets with and without spacers between each sheet; multi-layered spiral rolls, spiral wound adsorbent sheets, bundles of hollow fibers, as well as bundles of substantially parallel solid fibers. "Parallel channel contactors" are defined as a subset of adsorbent contactors including structured (engineered) adsorbents in which substantially parallel flow channels are incorporated into the adsorbent structure. Parallel flow channels are described in detail in United States Patent Publication Nos. 2008/0282892 and 2008/0282886, both of which herein incorporated by reference in their entirety. These flow channels may be formed by a variety of means and in addition to the adsorbent material, the adsorbent structure may contain items such as, but not limited to, support materials, heat sink materials, void reduction components, and heating/cooling passages.

Non-limiting examples of adsorbent materials that can be used with the method and system include high surface area (>10 m2/gm and preferably >75 m2/gm) alumina, microporous zeolites (preferably zeolites with particle sizes <1 mm), other microporous materials, mesoporous materials and ordered mesoporous materials. Nonlimiting examples of these materials include carbons, cationic zeolites, high silica zeolites, highly siliceous ordered mesoporous materials, sol gel materials, ALPO materials (microporous and mesoporous materials containing predominantly aluminum phosphorous and oxygen), SAPO materials (microporous and mesoporous materials containing predominantly silicon aluminum phosphorous and oxygen), MOF materials microporous and mesoporous materials comprised of a metal organic framework) and ZIF materials (microporous and mesoporous materials comprised of zeolitic imidazolate frameworks). Other materials include microporous and mesoporous sorbents functionalized with functional groups. Examples of functional groups include primary, secondary, tertiary and other non protogenic basic groups such as amidines, guanidines and biguanides.

Applications

Adsorptive kinetic separation processes, apparatus, and systems, as described above, are useful for development and production of hydrocarbons, such as gas and oil processing. Particularly, the provided processes, apparatus, and systems are useful for the rapid, large scale, efficient separation of a variety of target gases from gas mixtures. In particular, the processes, apparatus, and systems may be used to prepare natural gas products by removing contaminants and heavy hydrocarbons, i.e., hydrocarbons having at least two carbon atoms. The provided processes, apparatus, and systems are useful for preparing gaseous feed streams for use in utilities, including separation applications such as dew point control, sweetening/detoxification, corrosion protection/control, dehydration, heating value, conditioning, and purification. Examples of utilities that utilize one or more separation applications include generation of fuel gas, seal gas, non-potable water, blanket gas, instrument and control gas, refrigerant, inert gas, and hydrocarbon recovery. Exemplary "not to exceed" product (or "target") gas specifications include: (a) 2 volume percent (vol. %) CO2, 4 parts per million (ppm) H2S, (b) 50 ppm CO2, 4 ppm H2S, or (c) 1.5 vol. % CO2, 2 ppm H2S.

The provided processes, apparatus, and systems may be used to remove acid gas from hydrocarbon streams. Acid gas removal technology may be useful for gas reserves exhibit higher concentrations of acid gas, i.e., sour gas resources. Hydrocarbon feed streams vary widely in amount of acid gas, such as from several parts per million acid gas to 90 vol. % acid gas. Non-limiting examples of acid gas concentrations from exemplary gas reserves include concentrations of at least: (a) 1 vol. % H2S, 5 vol. % CO2, (b) 1 vol. % H2S, 15 vol. % CO2, (c) 1 vol. % H2S, 60 vol. % CO2, (d) 15 vol. % H2S, 15 vol. % CO2, and (e) 15 vol. % H2S, 30 vol. % CO2.

In one or more application, the streams provided to the adsorbent bed and removed from an adsorbent bed may have different compositions. For example, the hydrocarbon containing stream may have greater than 0.005 volume percent CO2 based on the total volume of the gaseous feed stream and an adsorbent material in the adsorbent bed has a higher selectivity to CO2 as compared to hydrocarbons. Also, the product stream may have greater than 98 volume percent hydrocarbons based on the total volume of the product stream. Further, the gaseous feed stream may be a hydrocarbon containing stream having greater than 20 volume percent CO2 based on the total volume of the gaseous containing stream.

The adsorbent bed assembly disclosed herein, or at least certain features and/or components thereof, are not limited to the particular uses described herein. For example, the use of the friction pads in fastening (e.g., using setscrews) may be applicable in any of numerous other applications outside of the hydrocarbon or chemical reaction technology fields. Such fastening techniques may be applied to other components that are subjected to cyclic thermal or pressure loads.

EMBODIMENTS

Certain, non-limiting, embodiments will now be set forth.

Embodiment 1. An adsorbent bed assembly for separation of gaseous mixtures, the assembly comprising: a body, the body at least partially defining an interior cavity, wherein the body includes: an outer shell; a first end engaged with the outer shell, including a first input/output in fluid communication with the interior cavity; a second end engaged with the outer shell, including a second input/output in fluid communication with the interior cavity; and a central support structure positioned within the interior cavity and coupled with the first and second ends and extending therebetween; a plurality of anti-telescoping devices positioned about the central support structure, wherein at least one of the anti-telescoping devices is affixed to the central support structure, and wherein each anti-telescoping device includes a plurality of spokes extending within the interior cavity from or proximate the central support structure towards the outer shell.

Embodiment 2. The adsorbent bed assembly of embodiment 1, further comprising a pad positioned on a surface of each spoke, the pad including an elastomeric material.

Embodiment 3. The adsorbent bed assembly of embodiment 2, wherein the elastomeric material is a non-metallic material.

Embodiment 4. The adsorbent bed assembly of embodiment 2 or 3, wherein the elastomeric material is a thermoplastic elastomer.

Embodiment 5. The adsorbent bed assembly of any of embodiments 2 to 4, wherein the elastomeric material is a fluoroelastomer.

Embodiment 6. The adsorbent bed assembly of any of embodiments 1 to 5, wherein the anti-telescoping devices maintain pre-loading of modules of adsorbent material positioned within the internal cavity.

Embodiment 7. The adsorbent bed assembly of any of embodiments 1 to 6, wherein at least one of the anti-telescoping devices is free-floating relative to the central support structure.

Embodiment 8. The adsorbent bed assembly of any of claims 1 to 7, wherein the anti-telescoping devices are affixable to the central support structure at continuously variable positions along a longitudinal length of the central support structure.

Embodiment 9. The adsorbent bed assembly of any of embodiments 1 to 8, wherein clamping loads are provided by the at least one anti-telescoping device that is affixed to the central support structure.

Embodiment 10. The adsorbent bed assembly of any of embodiments 1 to 9, wherein an uppermost anti-telescoping device, positioned closest to the first end, is affixed to the central support structure, and wherein a remainder of the anti-telescoping devices are free-floating relative to the central support structure.

Embodiment 11. The adsorbent bed assembly of any of embodiments 1 to 10, wherein each anti-telescoping device includes an inner ring positioned about the central support structure, and wherein the spokes are radial spokes that extend from the inner ring towards the outer shell.

Embodiment 12. The adsorbent bed assembly of any of embodiments 1 to 11, wherein each anti-telescoping device includes an outer ring coupled with the spokes opposite the inner ring.

Embodiment 13. The adsorbent bed assembly of any of embodiments 1 to 12, wherein the at least one anti-telescoping device is affixed to the central support structure via at least one setscrew.

Embodiment 14. The adsorbent bed assembly of embodiment 13, further comprising at least one friction pad positioned on the central support structure, between the central support structure and the anti-telescoping devices, wherein the at least one setscrew engages within the at least one friction pad.

Embodiment 15. The adsorbent bed assembly of any of embodiments 1 to 14, wherein the central support structure is coaxially aligned with a longitudinal centerline of the body.

Embodiment 16. The adsorbent bed assembly of any of embodiments 1 to 15, wherein the central support structure comprises: a central post coupled with the first end and the second end, wherein the central post extends within the interior cavity from the first end to the second end; a central pipe positioned about the central post, the central pipe coupled with the first end and the second end, wherein the central pipe extends within the interior cavity from the first end to the second end; and dead-volume defined between the central pipe and the central post.

Embodiment 17. The adsorbent bed assembly of any of embodiments 1 to 16, further comprising a filler material positioned within the dead volume.

Embodiment 18. The adsorbent bed assembly of any of embodiments 1 to 17, wherein the filler material includes a low-porosity material.

Embodiment 19. The adsorbent bed assembly of embodiment 17 or 18, wherein the filler material includes a stack of ceramic discs.

Embodiment 20. The adsorbent bed assembly of any of embodiments 1 to 19, wherein the first input/output and the second input/output each comprise a distributor plate including a plurality of holes positioned therethrough and in fluid communication with the interior cavity.

Embodiment 21. The adsorbent bed assembly of embodiment 20, wherein the first end of the body further comprises a top flange coupled with the distributor plate of the first input/output.

Embodiment 22. The adsorbent bed assembly of embodiment 20, wherein the second end of the body further comprises a bottom cap coupled with the distributor plate of the second input/output.

Embodiment 23. The adsorbent bed assembly of any of embodiments 20 to 22, wherein the top flange, the distributor plates, or combinations thereof comprise a dimensionally stable, low-coefficient of thermal expansion (CTE) metal alloy.

Embodiment 24. The adsorbent bed assembly of embodiment 23, wherein the metal alloy is a nickel-iron alloy.

Embodiment 25. The adsorbent bed assembly of embodiment 24, wherein the nickel-iron alloy includes 64FeNi.

Embodiment 26. The adsorbent bed assembly of any of embodiments 1 to 25, further comprising adsorbent material positioned within the internal cavity between the central support structure and the outer shell.

Embodiment 27. The adsorbent bed assembly of embodiments 26, wherein the adsorbent material comprises a coated, wound core.

Embodiment 28. The adsorbent bed assembly of embodiment 26 or 27, wherein the adsorbent material comprises a series of adsorbent modules arranged axially along the central support structure.

Embodiment 29. The adsorbent bed assembly of any of embodiments 26 to 28, wherein the adsorbent material comprises adsorbent coated elements.

Embodiment 30. The adsorbent bed assembly of any of embodiments 26 to 29, wherein the adsorbent material comprises adsorbent-coated metal foil, uncoated foil, adsorbent-coated wire mesh, or combinations thereof.

Embodiment 31. The adsorbent bed assembly of any of embodiments 26 to 30, wherein the adsorbent material comprises adsorbent-coated corrugated foil, adsorbent-coated corrugated mesh, adsorbent-coated flat foil, uncoated foil, adsorbent-coated flat mesh, or combinations thereof.

Embodiment 32. The adsorbent bed assembly of any of embodiments 26 to 31, wherein the adsorbent material defines triangular or substantially triangular shaped channels of porosity, or wherein the adsorbent material defines trapezoidal or substantially trapezoidal shaped channels of porosity.

Embodiment 33. The adsorbent bed assembly of any of embodiments 26 to 32, wherein the adsorbent material comprises one or more coated elements arranged relative to the central support structure.

Embodiment 34. The adsorbent bed assembly of any of embodiments 26 to 33, wherein the adsorbent material comprises a continuous spiral winding about the central support structure, or comprises multiple, separate, radial or curved elements positioned about the central support structure.

Embodiment 35. The adsorbent bed assembly of any of embodiments 1 to 34, further comprising one or more flow straightening structure.

Embodiment 36. The adsorbent bed assembly of embodiment 35, wherein the one or more flow straightening structures comprise a flow straightening structure positioned between the first input/output and adsorbent material within the internal cavity, a flow straightening structure positioned between the second input/output and adsorbent material within the internal cavity, or combinations thereof.

Embodiment 37. The adsorbent bed assembly of embodiment 35 or 36, wherein the one or more flow straightening structures are free of adsorbent material.

Embodiment 38. The adsorbent bed assembly of any of embodiments 1 to 37, further comprising compressible insulation positioned on an inner diameter of modules of adsorbent material disposed within the internal cavity, compressible insulation positioned on an outer diameter of modules of adsorbent material disposed within the internal cavity, or combinations thereof.

Embodiment 39. The adsorbent bed assembly of embodiment 38, wherein the compressible insulation at least partially seals the modules of adsorbent material from heat loss, bypassing of gas thereabout, or combinations thereof.

Embodiment 40. The adsorbent bed assembly of embodiment 38 or 39, wherein the compressible insulation positioned on the inner diameter of modules of adsorbent material includes a plurality of segments of compressible insulation, including segments of compressible insulation positioned between adjacent anti-telescoping devices.

Embodiment 41. The adsorbent bed assembly of any of embodiments 38 to 40, further comprising center compressible insulation positioned between the second end of the body and the internal cavity.

Embodiment 42. The adsorbent bed assembly of any of embodiments 1 to 41, further comprising sealant disposed adjacent an inner diameter of modules of adsorbent material within the internal cavity, sealant disposed adjacent an outer diameter of modules of adsorbent material within the internal cavity, or combinations thereof.

Embodiment 43. The adsorbent bed assembly of embodiment 42, wherein the sealant is disposed between an end of each segment of inner compressible insulation and one of the anti-telescoping devices, wherein the sealant is disposed within a channel in the outer compressible insulation, or combinations thereof.

Embodiment 44. The adsorbent bed assembly of embodiment 42 or 43, wherein the sealant at least partially seals the modules of adsorbent material from bypassing of gas thereabout.

Embodiment 45. The adsorbent bed assembly of any of embodiments 1 to 44, wherein the adsorbent bed assembly is a cylindrical or generally cylindrical structure.

Embodiment 46. The adsorbent bed assembly of any of embodiments 1 to 45, wherein the adsorbent bed assembly is installed in a vertical orientation within a pressure vessel.

Embodiment 47. The adsorbent bed assembly of any of embodiments 1 to 46, wherein the outer shell is a seam welded metal canister, including at least one seam weld.

Embodiment 48. The adsorbent bed assembly of embodiment 47, wherein the at least one seam weld is positioned between two spokes of one of the anti-telescoping devices.

Embodiment 49. The adsorbent bed assembly of any of embodiments 38 to 48, wherein adsorbent material is engaged with the compressible insulation positioned on the outer diameter of modules of adsorbent material disposed within the internal cavity, wherein adsorbent material is engaged with the compressible insulation positioned on the inner diameter of modules of adsorbent material disposed within the internal cavity, or combinations thereof.

Embodiment 50. The adsorbent bed assembly of any of embodiments 1 to 49, wherein the outer shell comprises a metal canister having an integral flange positioned around the compressible insulation that is positioned on the outer diameter of modules of adsorbent material, the metal canister compressing the compressible insulation that is positioned on the outer diameter of modules of adsorbent material.

Embodiment 51. The adsorbent bed assembly of any of embodiments 1 to 50, wherein the anti-telescoping devices are positioned and arranged to maintain pre-load on individual adsorbent modules within the internal cavity, and to prevent telescoping movement of the individual adsorbent modules.

Embodiment 52. A rapid cycle swing adsorption process, the process comprising: providing an adsorbent bed assembly comprising: a body, the body at least partially defining an interior cavity; a central support structure positioned within the interior cavity and coupled with the body; a plurality of anti-telescoping devices positioned about the central support structure, wherein at least one of the anti-telescoping devices is affixed to the central support structure; and adsorbent material positioned within the internal cavity; passing a gaseous feed stream containing at least a first component and a second component through an input of the adsorbent bed assembly; passing the gaseous feed stream through the adsorbent material, and selectively adsorbing the first component on the adsorbent material; and expelling a product stream, enriched in the second component and depleted in the first component, from the adsorbent bed assembly.

Embodiment 53. The process of embodiment 52, further comprising providing clamping load to the adsorbent material using the anti-telescoping devices.

Embodiment 54. The process of embodiment 52 or 53, further comprising accommodating thermal expansion of adsorbent material or other components of the adsorbent bed assembly using thermally compliant pads positioned on the anti-telescoping devices.

Embodiment 55. The process of any of embodiments 52 to 54, further comprising reducing heat loss from the adsorbent bed assembly by positioning compressible insulation layers within the adsorbent bed assembly, about the inner and outer diameters of the adsorbent material, and positioning sealants between the inner compressible insulation layers and the anti-telescoping devices, or within channels in the outer compressible insulation layers.

Embodiment 56. The process of any of embodiments 52 to 55, further comprising reducing dead volume of the adsorbent bed assembly by filling void space within the adsorbent bed assembly with a filler material.

Embodiment 57. The process of embodiment 56, wherein the filler material comprises ceramic discs.

Embodiment 58. The process of any of embodiments 52 to 57, further comprising: prior to passing the gaseous feed stream through the adsorbent material, passing the gaseous feed stream through a first flow straightening structure; after passing the gaseous feed stream through the adsorbent material and prior to expelling the product stream from the adsorbent bed assembly, passing the gas through a second flow straightening structure; or combinations thereof.

Embodiment 59. The process of embodiment 58, wherein passing the gas through the flow straightening structures straightens a flow of the gaseous feed stream.

Embodiment 60. The process of any of embodiments 52 to 59, wherein the rapid cycle swing adsorption processes is a rapid cycle pressure swing adsorption process, a rapid cycle temperature swing adsorption process, or combinations thereof.

Embodiment 61. A method of coupling two components subjected to cyclic thermal or pressure loads, the method comprising: coupling a first rigid component to a second rigid component via at least one setscrew; wherein at least one friction pad is positioned on the second component, between the second component and the first component, and wherein the at least one setscrew engages within the at least one friction pad.

Although the present embodiments and advantages have been described in detail, it should be understood that various changes, substitutions and alterations can be made herein without departing from the spirit and scope of the disclosure. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An adsorbent bed assembly for separation of gaseous mixtures, the assembly comprising:
   a body, the body at least partially defining an interior cavity, wherein the body includes:
      an outer shell;
      a first end engaged with the outer shell, including a first input/output in fluid communication with the interior cavity;
      a second end engaged with the outer shell, including a second input/output in fluid communication with the interior cavity; and
      a central support structure positioned within the interior cavity and coupled with the first and second ends and extending therebetween;
   a plurality of anti-telescoping devices positioned about the central support structure, wherein at least one of the anti-telescoping devices is affixed to the central support structure, and wherein each anti-telescoping device includes a plurality of spokes extending within the interior cavity from or proximate the central support structure towards the outer shell.

2. The adsorbent bed assembly of claim 1, further comprising a pad positioned on a surface of each spoke, the pad including an elastomeric material.

3. The adsorbent bed assembly of any of claim 1, wherein the anti-telescoping devices maintain pre-loading of modules of adsorbent material positioned within the internal cavity.

4. The adsorbent bed assembly of claim 1, wherein at least one of the anti-telescoping devices is free-floating relative to the central support structure.

5. The adsorbent bed assembly of claim 1, wherein the anti-telescoping devices are affixable to the central support structure at continuously variable positions along a longitudinal length of the central support structure.

6. The adsorbent bed assembly of claim 1, wherein clamping loads are provided by the at least one anti-telescoping device that is affixed to the central support structure.

7. The adsorbent bed assembly of claim 1, wherein each anti-telescoping device includes an inner ring positioned about the central support structure, and wherein the spokes are radial spokes that extend from the inner ring towards the outer shell.

8. The adsorbent bed assembly of claim 1, wherein the at least one anti-telescoping device is affixed to the central support structure via at least one setscrew.

9. The adsorbent bed assembly of claim 8, further comprising at least one friction pad positioned on the central support structure, between the central support structure and the anti-telescoping devices, wherein the at least one setscrew engages within the at least one friction pad.

10. The adsorbent bed assembly of claim 1, wherein the central support structure comprises:
    a central post coupled with the first end and the second end, wherein the central post extends within the interior cavity from the first end to the second end;
    a central pipe positioned about the central post, the central pipe coupled with the first end and the second end, wherein the central pipe extends within the interior cavity from the first end to the second end; and
    dead-volume defined between the central pipe and the central post.

11. The adsorbent bed assembly of claim 10, further comprising a filler material positioned within the dead volume.

12. The adsorbent bed assembly of claim 1, wherein the first input/output and the second input/output each comprise a distributor plate including a plurality of holes positioned therethrough and in fluid communication with the interior cavity, wherein the first end of the body further comprises a top flange coupled with the distributor plate of the first input/output, and wherein the second end of the body further comprises a bottom cap coupled with the distributor plate of the second input/output.

13. The adsorbent bed assembly of claim 12, wherein the top flange, the distributor plates, or combinations thereof comprise a dimensionally stable, low-coefficient of thermal expansion (CTE) metal alloy.

14. The adsorbent bed assembly of claim 1, further comprising adsorbent material positioned within the internal cavity between the central support structure and the outer shell.

15. The adsorbent bed assembly of claim 14, wherein the adsorbent material defines triangular or substantially triangular shaped channels of porosity, or wherein the adsorbent material defines trapezoidal or substantially trapezoidal shaped channels of porosity.

16. The adsorbent bed assembly of claim 1, further comprising a flow straightening structure positioned between the first input/output and adsorbent material within the internal cavity, a flow straightening structure positioned between the second input/output and adsorbent material within the internal cavity, or combinations thereof.

17. The adsorbent bed assembly of claim 1, further comprising compressible insulation positioned on an inner diameter of modules of adsorbent material disposed within the internal cavity, compressible insulation positioned on an outer diameter of modules of adsorbent material disposed within the internal cavity, or combinations thereof.

18. The adsorbent bed assembly of claim 17, further comprising:
sealant disposed adjacent an inner diameter of modules of adsorbent material within the internal cavity, wherein the sealant is disposed between an end of each segment of inner compressible insulation and one of the anti-telescoping devices;
sealant disposed adjacent an outer diameter of modules of adsorbent material within the internal cavity, wherein the sealant is disposed within a channel in the outer compressible insulation layers; or
combinations thereof.

19. The adsorbent bed assembly of claim 17, wherein adsorbent material is engaged with the compressible insulation positioned on the outer diameter of modules of adsorbent material disposed within the internal cavity, wherein adsorbent material is engaged with the compressible insulation positioned on the inner diameter of modules of adsorbent material disposed within the internal cavity, or combinations thereof.

20. The adsorbent bed assembly of claim 1, wherein the anti-telescoping devices are positioned and arranged to maintain pre-load on individual adsorbent modules within the internal cavity, and to prevent telescoping movement of the individual adsorbent modules.

21. A rapid cycle swing adsorption process, the process comprising:
providing an adsorbent bed assembly comprising: a body, the body at least partially defining an interior cavity; a central support structure positioned within the interior cavity and coupled with the body; a plurality of anti-telescoping devices positioned about the central support structure, wherein at least one of the anti-telescoping devices is affixed to the central support structure; and adsorbent material positioned within the internal cavity;
passing a gaseous feed stream containing at least a first component and a second component through an input of the adsorbent bed assembly;
passing the gaseous feed stream through the adsorbent material, and selectively adsorbing the first component on the adsorbent material; and
expelling a product stream, enriched in the second component and depleted in the first component, from the adsorbent bed assembly.

22. The process of claim 21, further comprising:
providing clamping load to the adsorbent material using the anti-telescoping devices; and
accommodating thermal expansion of adsorbent material or other components of the adsorbent bed assembly using thermally compliant pads positioned on the anti-telescoping devices.

23. The process of claim 21, further comprising reducing dead volume of the adsorbent bed assembly by filling void space within the adsorbent bed assembly with a filler material.

24. An adsorbent bed assembly for separation of gaseous mixtures, the assembly comprising:
a body, the body at least partially defining an interior cavity, wherein the body includes:
an outer shell;
a first end engaged with the outer shell, including a first input/output in fluid communication with the interior cavity;
a second end engaged with the outer shell, including a second input/output in fluid communication with the interior cavity; and
a central support structure positioned within the interior cavity and coupled with the first and second ends and extending therebetween;
a plurality of anti-telescoping devices positioned about the central support structure, wherein at least one of the anti-telescoping devices is affixed to the central support structure, wherein the anti-telescoping devices maintain pre-loading of modules of adsorbent material positioned within the internal cavity, and wherein the anti-telescoping devices are affixable to the central support structure at continuously variable positions along a longitudinal length of the central support structure.

* * * * *